Figure 2:
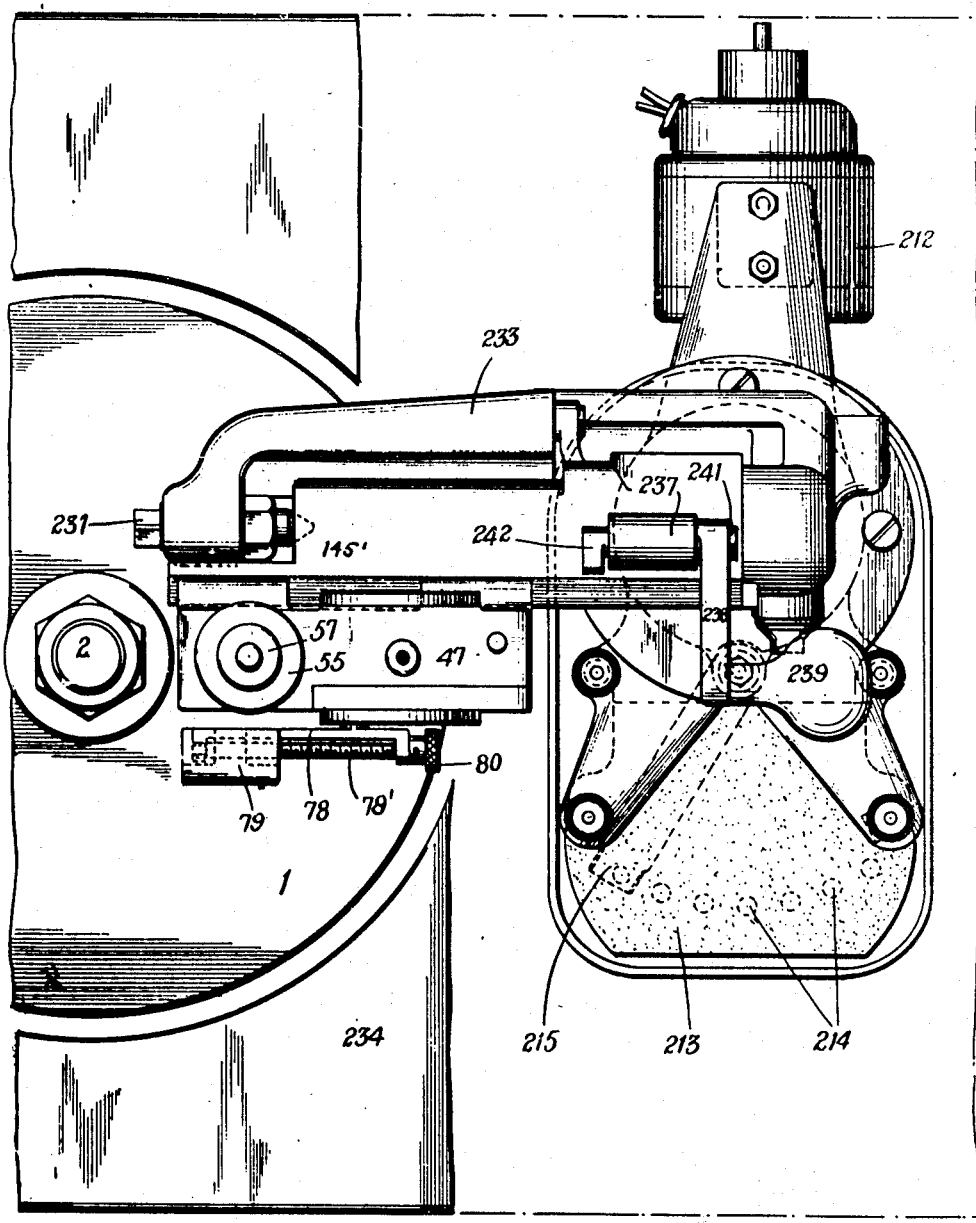

J. G. C. MANTLE.
POLISHING MACHINE.
APPLICATION FILED NOV. 16, 1914. RENEWED SEPT. 23, 1916.
1,313,402.
Patented Aug. 19, 1919.
10 SHEETS—SHEET 1.
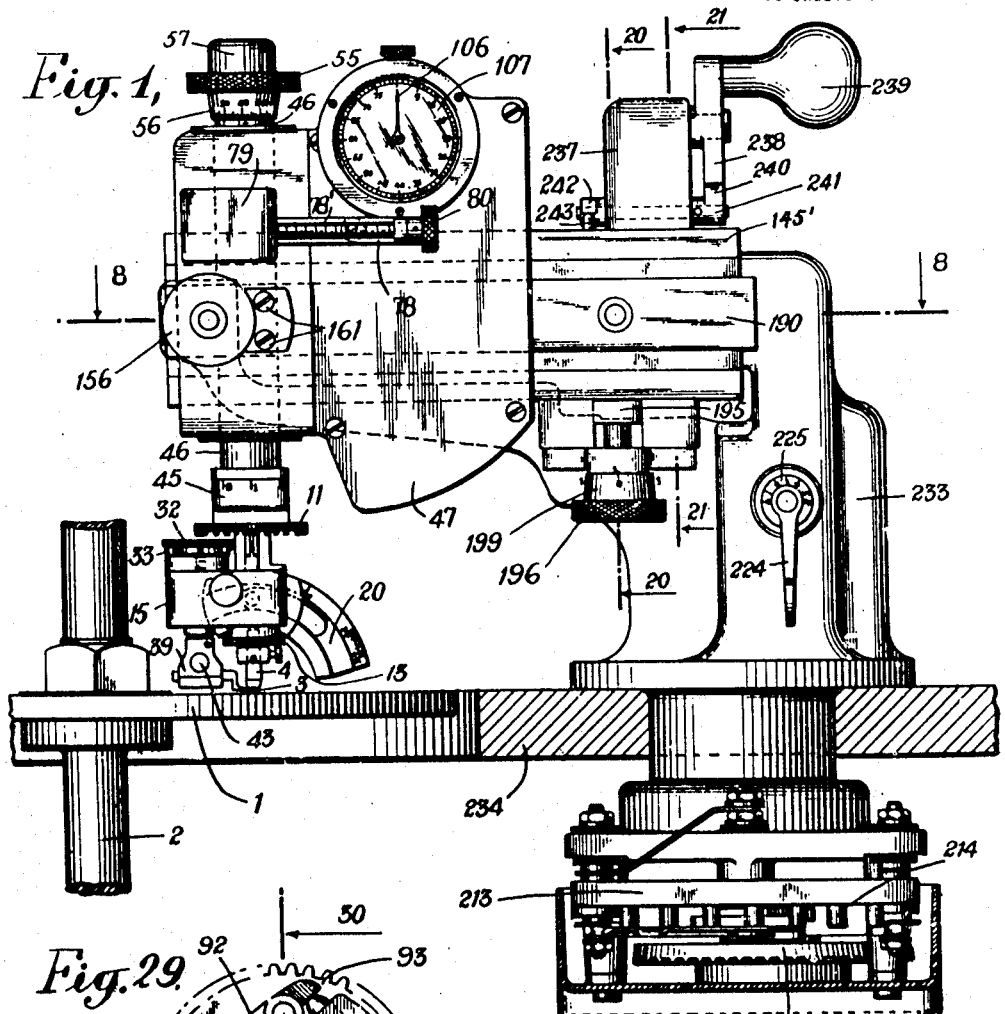
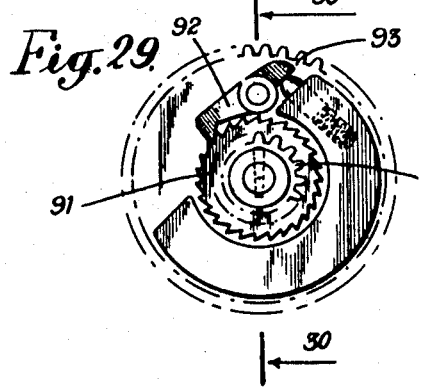
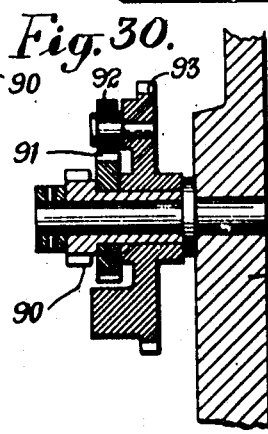
WITNESSES
INVENTOR
Joseph G. C. Mantle
BY
Kenyon & Kenyon
ATTORNEYS

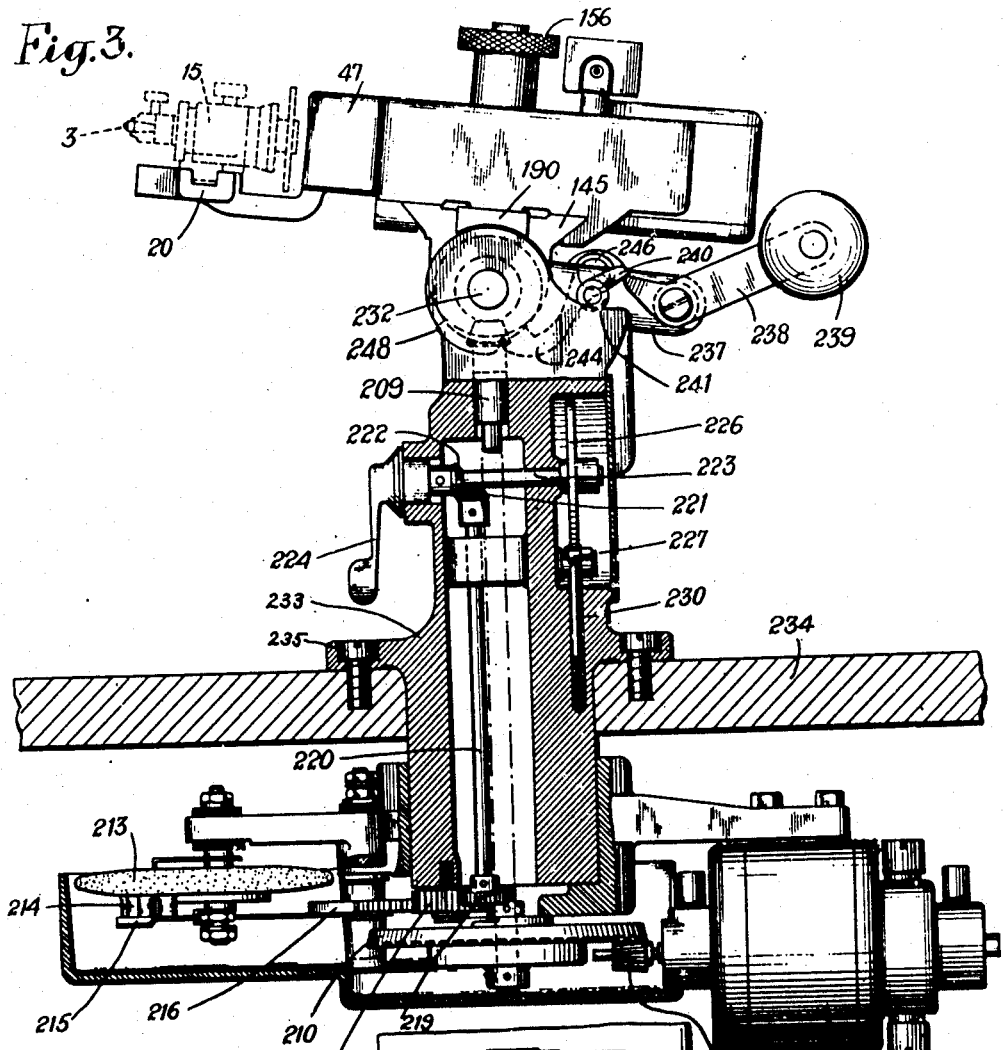
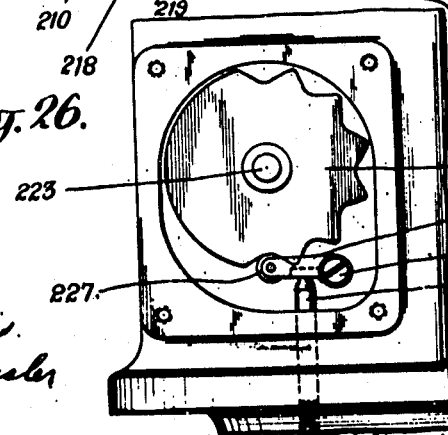

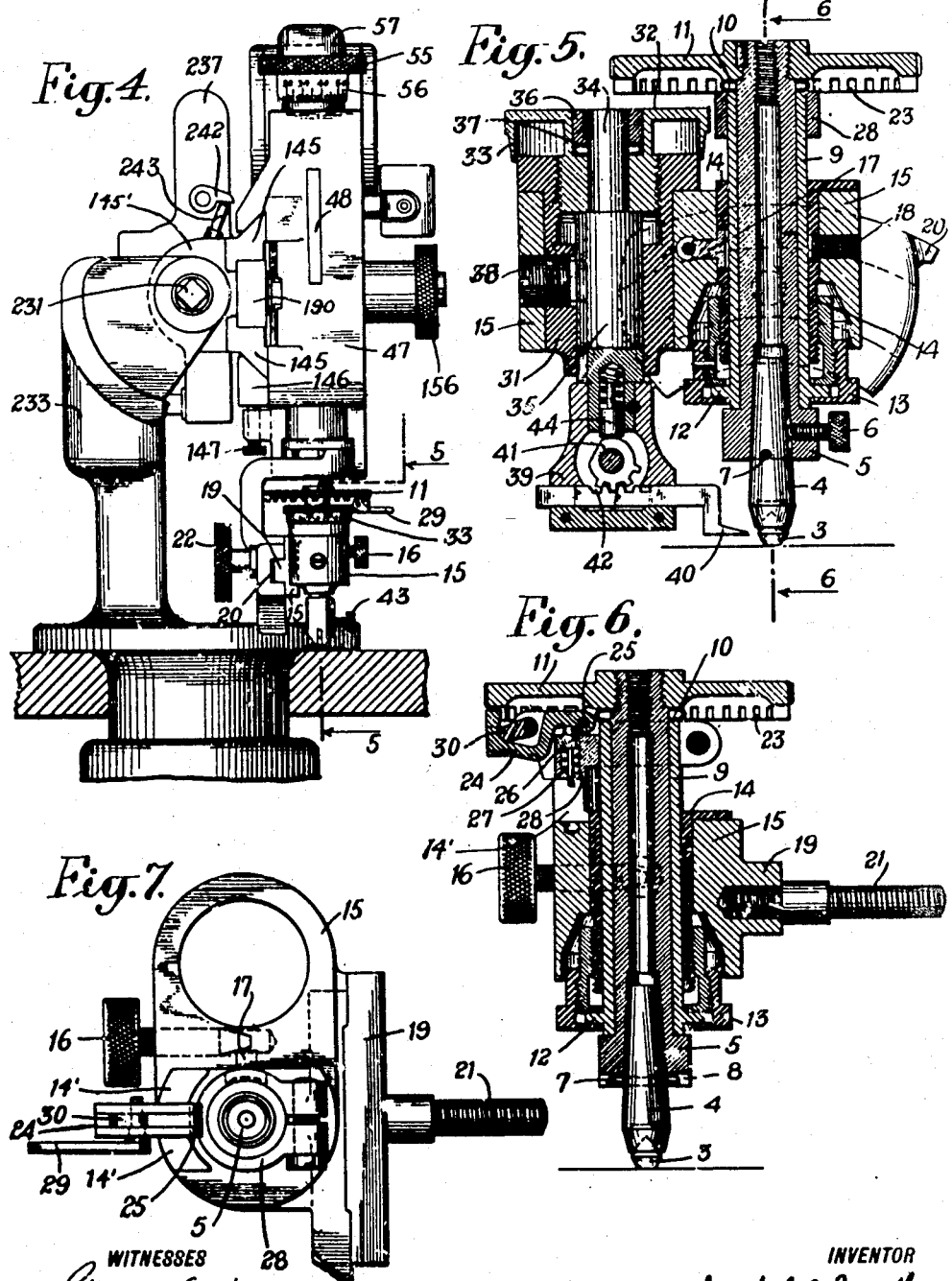

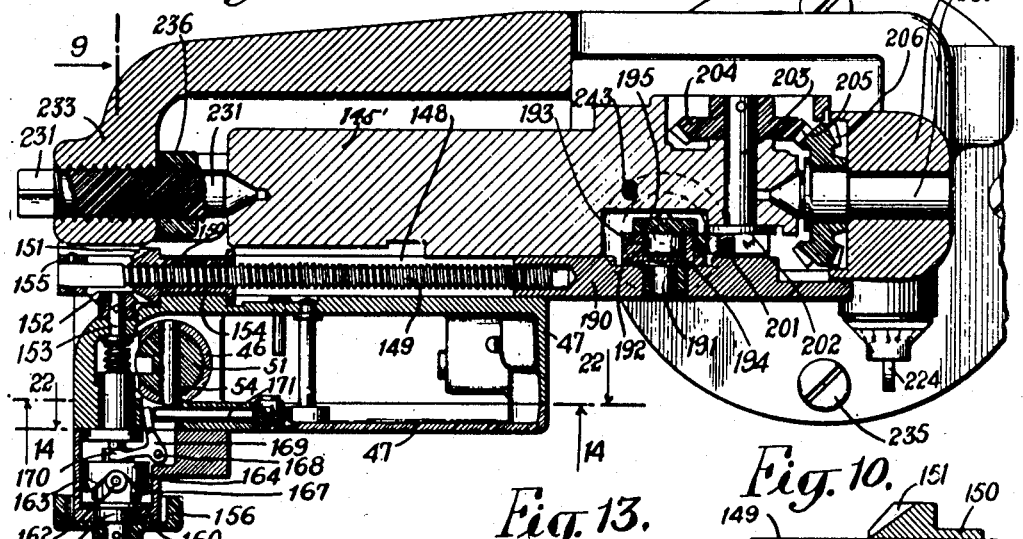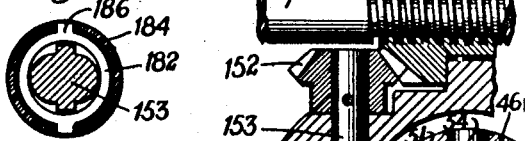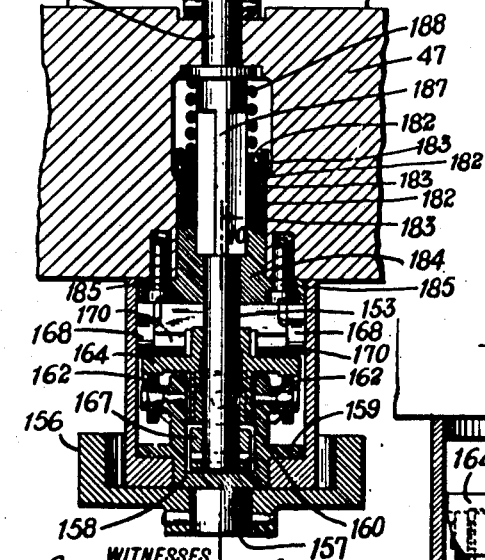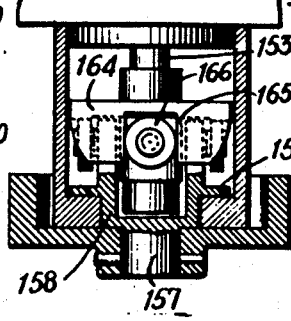

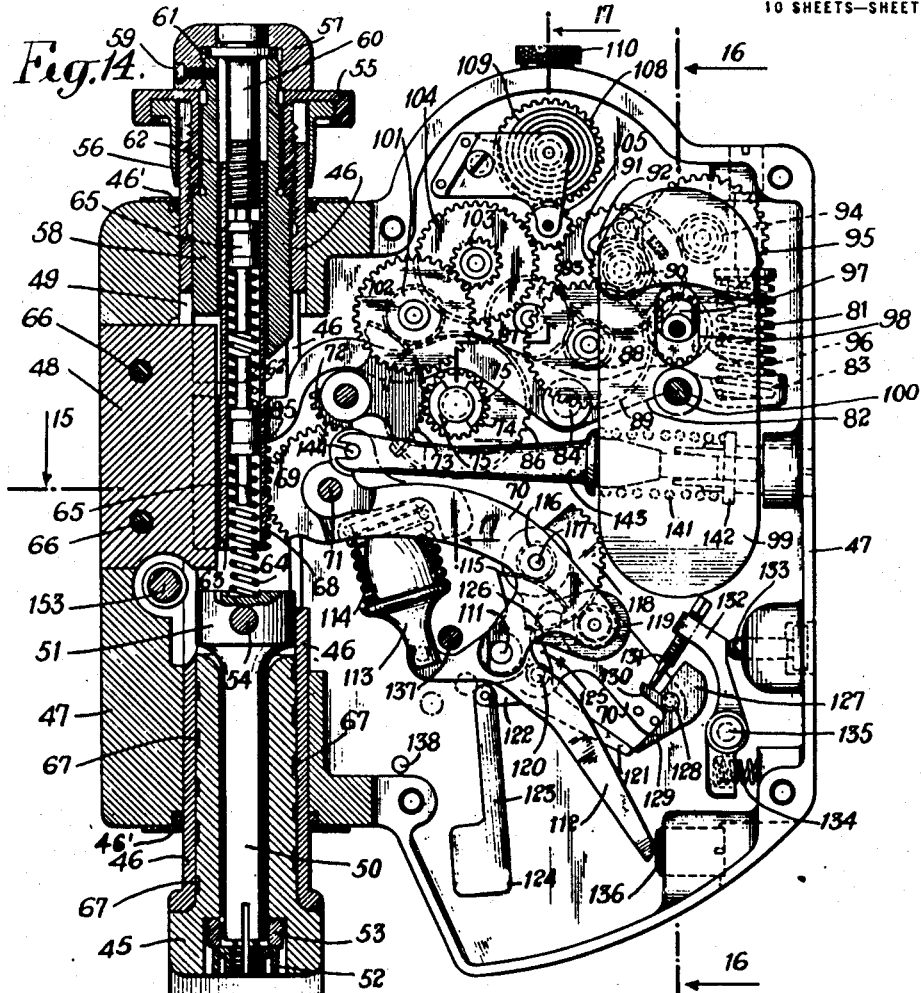
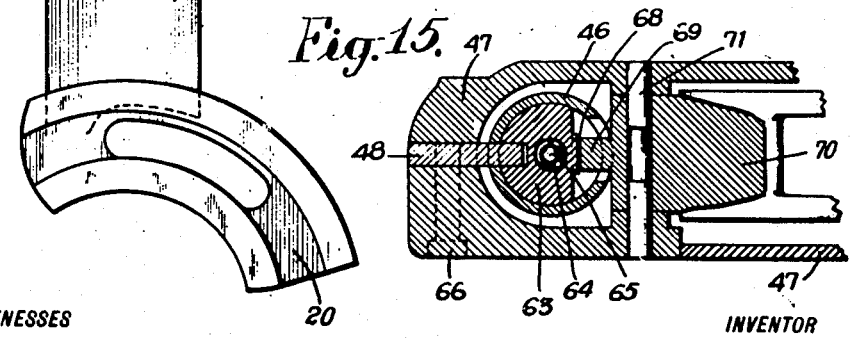

J. G. C. MANTLE.
POLISHING MACHINE.
APPLICATION FILED NOV. 16, 1914. RENEWED SEPT. 23, 1918.

1,313,402.

Patented Aug. 19, 1919.
10 SHEETS—SHEET 7.

WITNESSES

INVENTOR
Joseph G. C. Mantle
BY Kenyon & Kenyon
ATTORNEYS

J. G. C. MANTLE.
POLISHING MACHINE.
APPLICATION FILED NOV. 16, 1914. RENEWED SEPT. 23, 1916.

1,313,402.

Patented Aug. 19, 1919.
10 SHEETS—SHEET 8.

WITNESSES

INVENTOR
Joseph J. C. Mantle
BY
Kenyon & Kenyon
ATTORNEYS

J. G. C. MANTLE.
POLISHING MACHINE.
APPLICATION FILED NOV. 16, 1914. RENEWED SEPT. 23, 1916.
1,313,402.
Patented Aug. 19, 1919.
10 SHEETS—SHEET 9.
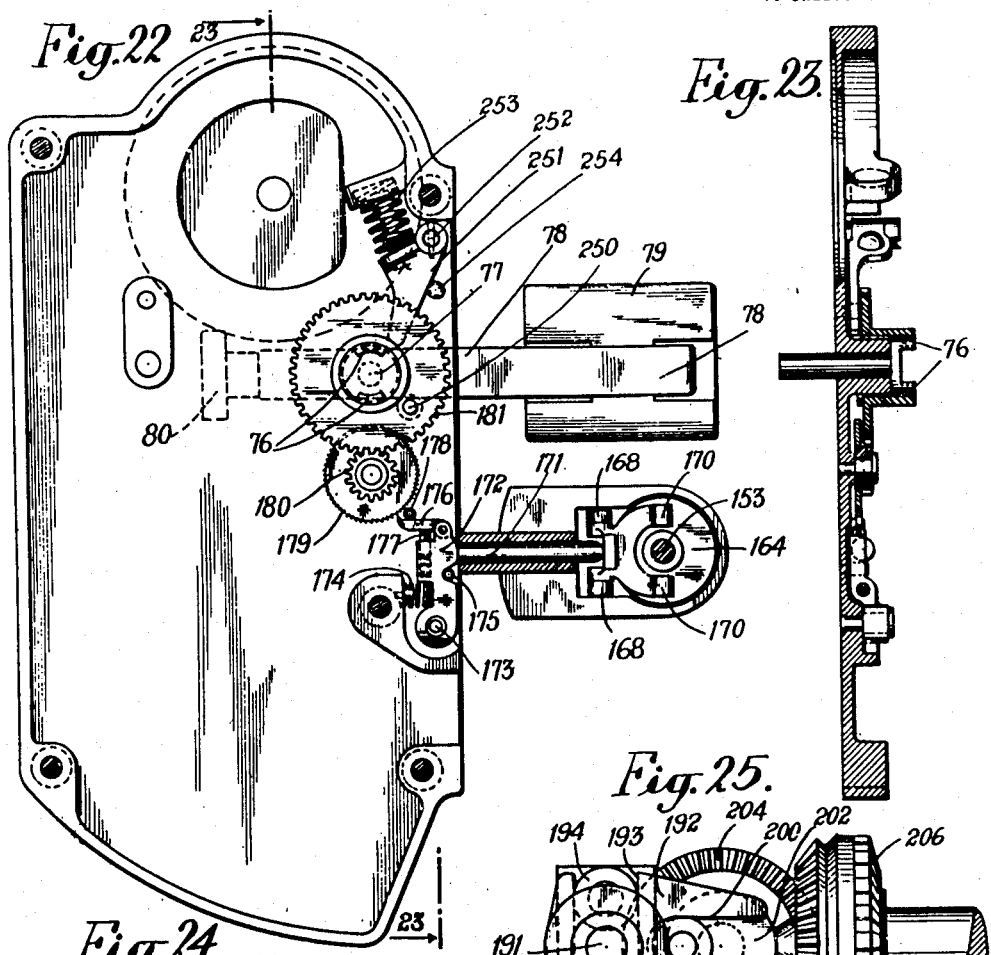
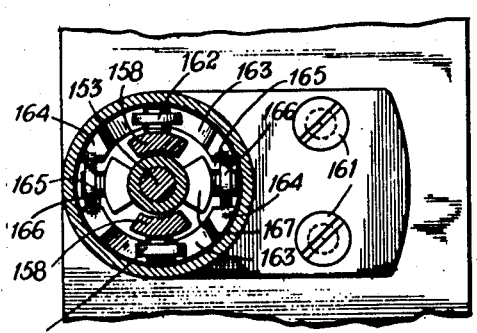
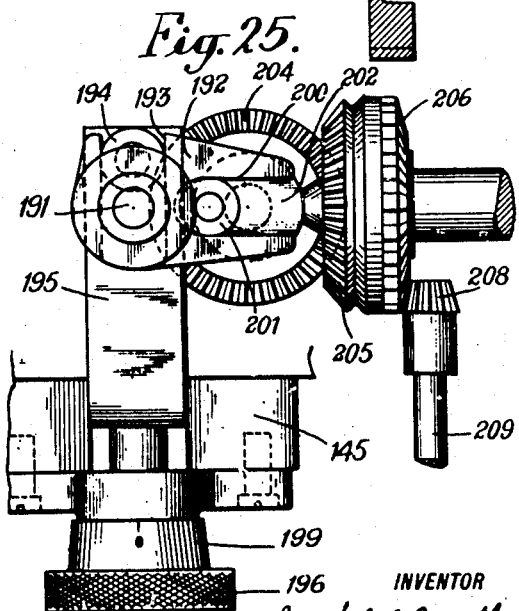
INVENTOR
Joseph G. C. Mantle
BY
Kenyon & Kenyon
ATTORNEYS Fig.31. Fig.32. Fig.33. Fig.34.
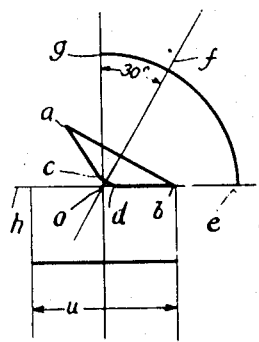 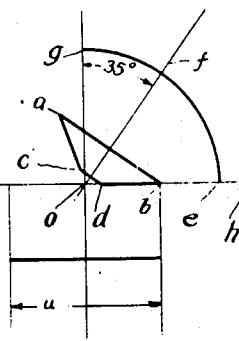 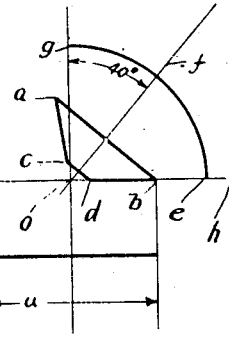 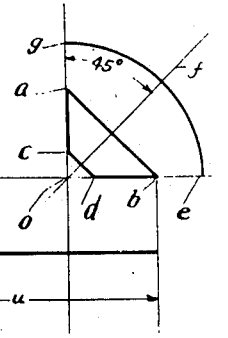
Fig.35 Fig.36 Fig.37. Fig.38.
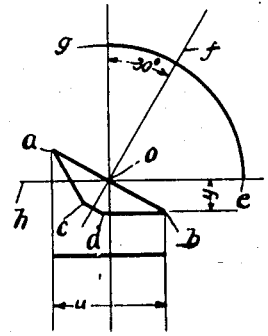 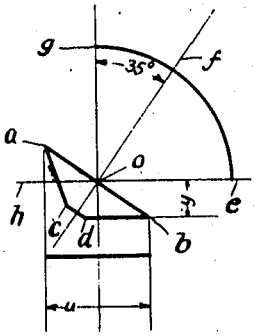 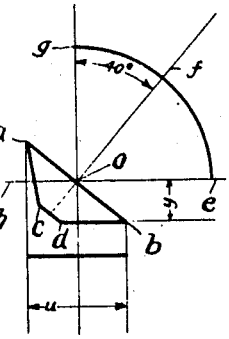 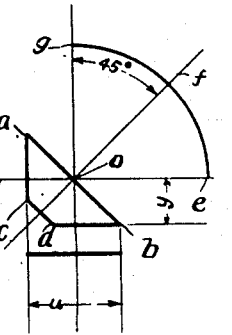
Fig.39. Fig.40. Fig.41. Fig.42.
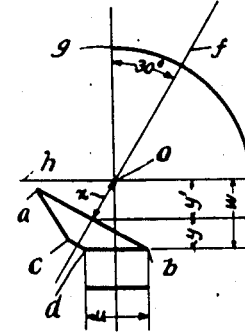 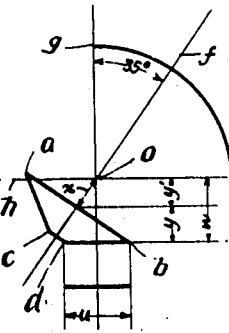 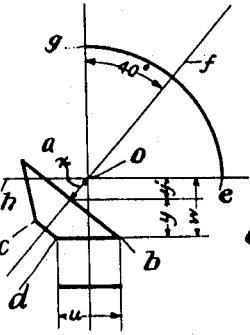 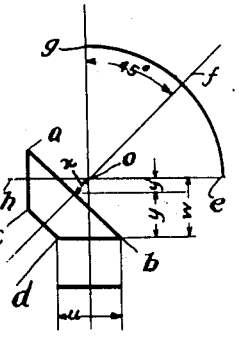

UNITED STATES PATENT OFFICE.

JOSEPH G. C. MANTLE, OF NEW YORK, N. Y., ASSIGNOR TO STERN-COLEMAN DIAMOND MACHINE CO., INC., A CORPORATION OF NEW YORK.

POLISHING-MACHINE.

1,313,402.

Specification of Letters Patent.     Patented Aug. 19, 1919.

Application filed November 16, 1914, Serial No. 872,363.   Renewed September 23, 1916.   Serial No. 121,906.

*To all whom it may concern:*

Be it known that I, JOSEPH G. C. MANTLE, a citizen of the United States, and a resident of New York, county of New York, State of New York, have invented certain new and useful Improvements in Polishing-Machines, of which the following is a specification.

The invention relates to improvements in machines for grinding and polishing gems, such as diamonds and other bodies requiring similar operations. The invention will be illustrated and described in connection with a machine more particularly designed for the grinding and polishing of diamonds on a rotary lap. As is well understood, such operations require extreme preciseness and great care. Among the various objects, features and advantages of the invention are the following:—

A stone of determined or known diameter of girdle may be readily and easily set into exact position for the grinding of any number and of any desired angle of facets, or for the grinding of its table at any desired height above its girdle and the grinding or polishing automatically stopped at the desired point.

An operation scale is provided, easily readable to within one one-thousandth of an inch, which may be readily set as desired, or in accordance with calculated tables for the grinding of stones of various diameters of girdle, and number and angle of facets,— the scale being adapted to be set in accordance with the diameter of girdle, number of facets and height of table above the girdle, required.

A setting scale, easily readable to within one one-thousandth of an inch, is provided, which may be readily set as desired in accordance with calculated tables, so that stones of various sizes and shapes may be readily set into exact position for the grinding of table and facets of required number and angle thereon, and such, that when rotated, in order that the grain of the stone may be brought into proper relation with the moving, grinding or polishing surface, the narrowest possible band on the grinding surface or grinding disk may be used.

A grinding scale, easily readable and directly indicating to within one one-thousandth of an inch, is provided, whereby the progress of the grinding operation and the amount to be ground off is continually indicated, this grinding scale being so arranged that when any of the grinding operations are completed, the scale reads at zero, or a certain fixed point, irrespective of the kind of operation or the amount to be ground off.

Means are provided for independently adjusting the apparatus to suit an altered relative level of grinding surface to the parts holding the stone, due to the wear of the grinding surface or other causes, such adjustment not affecting any other adjustment or scale reading.

Improved positively acting means are provided for automatically withdrawing the stone from the grinding surface, when the grinding or polishing operation is completed, and such that this withdrawal may always occur at the zero reading or fixed point reading on the grinding scale. This withdrawal is accomplished by a tripping mechanism, which is of such a nature that should the operator omit to set it, the machine cannot grind down beyond the required point. Efficient adjusting means are provided to compensate for the wear of this tripping mechanism, so that it may always operate at the zero or fixed point reading on the grinding scale.

Means are provided whereby the stone may be reciprocated on the grinding surface, and both amplitude and rate of such reciprocation be varied as desired, within predetermined limits.

Improved means are provided for shifting the stone laterally over the grinding surface, in order to remove it from one grinding band to another, and further means are provided whereby the stone is automatically slightly withdrawn from the grinding surface, prior to giving it such lateral movement.

Improved means are provided for gradually increasing the pressure with which the stone is pressed against the grinding surface, and for causing the gradual approach of the stone to the grinding surface, and such that when the grinding or polishing operation is completed, the stone may be quickly removed from the polishing surface without being retarded by the means for causing the gradual approach of the stone toward the grinding surface.

The apparatus is so arranged that a stone may be removed from the polishing surface during any operation thereon, for the purpose of inspection of the stone, without stopping the machine, or interfering in any way with its adjustments, and permitting of the immediate replacing of the stone against the polishing surface, in exactly the same position that it was before such removal.

The arrangement of the various parts of the machine are such that it occupies very small space, whereby a plurality of machines may be operated in conjunction with a single grinding or polishing wheel or disk of the usual dimensions. The various parts of the machine are so arranged and so easily adjusted that a single operator may attend to a plurality of machines, and without any danger of the stones being ground further than desired.

Various other objects, features and advantages will more clearly appear from the detailed description given below, taken in connection with the accompanying drawings, which form part of this specification.

Figure 16:
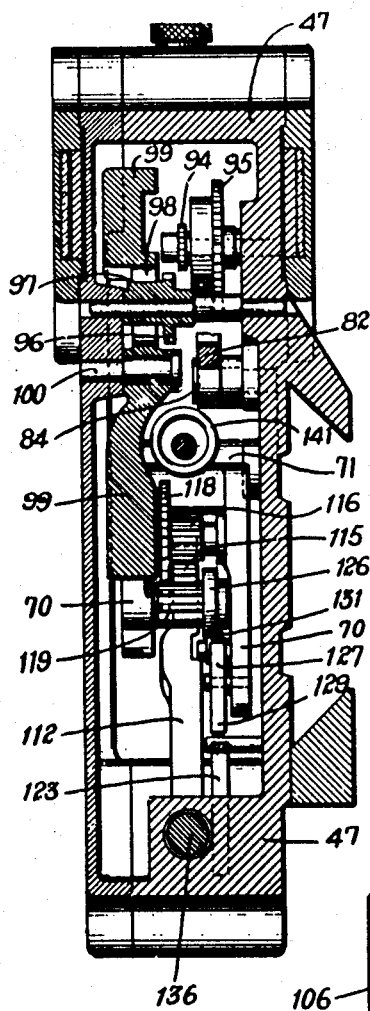
Figure 18:
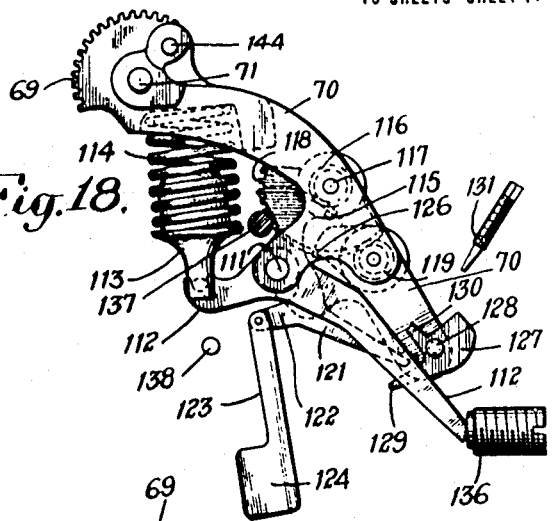
Figure 19:
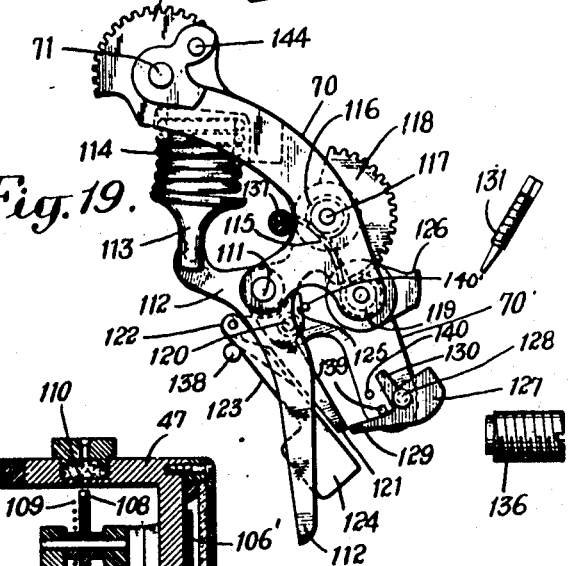
Figure 17:
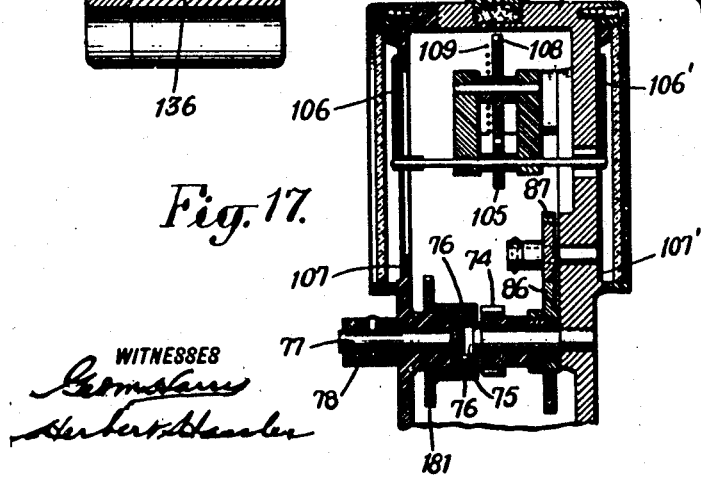
Figure 20:
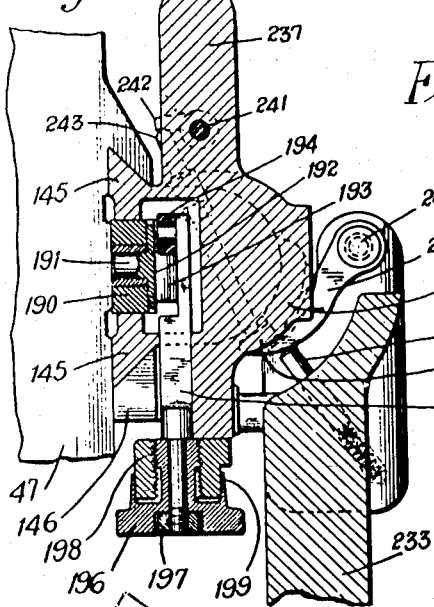
Figure 21:
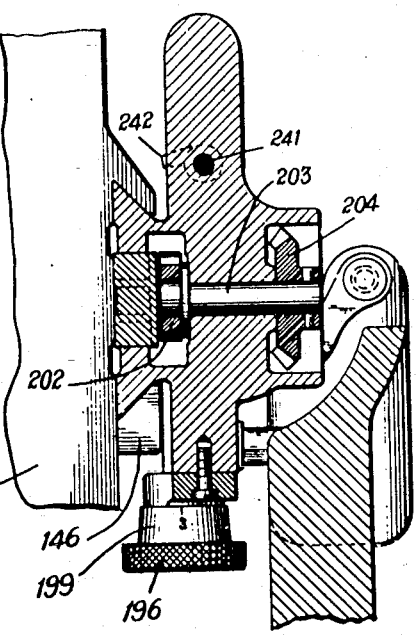
Figures 27, 28:
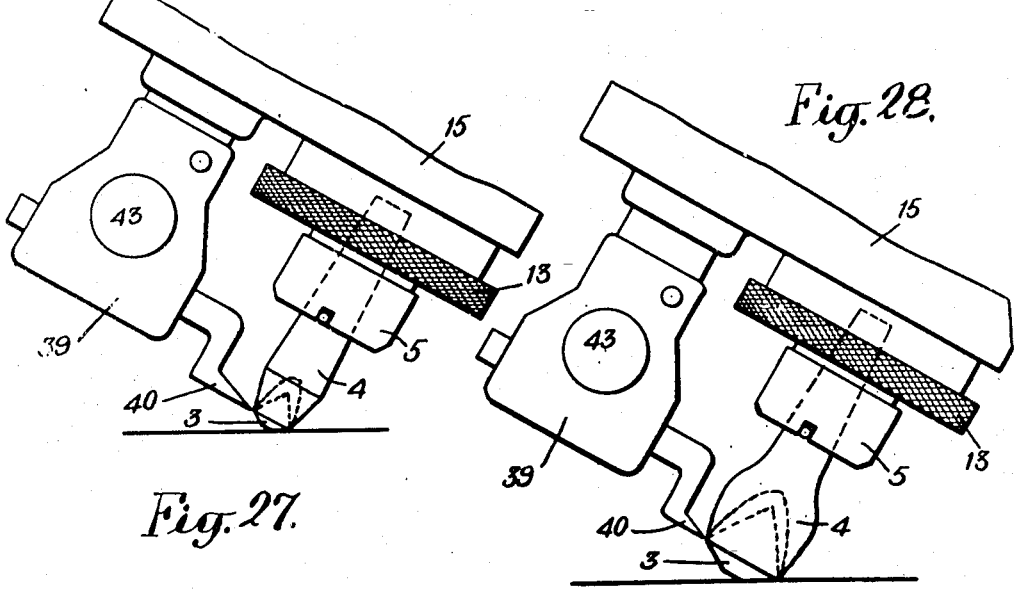

Referring to the drawings:—Figure 1 represents an elevation of a machine embodying my improvements in a preferred form, certain parts being shown in section to more clearly illustrate the same. Fig. 2 is a plan view of the machine. Fig. 3 is an end elevation of the machine, certain parts being shown in section, in order to more clearly illustrate the same. Fig. 4 is also an end elevation, showing the opposite end from that shown in Fig. 3. Fig. 5 is a vertical section of the dop-holder or stone-holding parts, taken on the line 5—5 of Fig. 4. Fig. 6 is a section taken on the line 6—6 of Fig. 5. Fig. 7 is a plan view of parts shown in Fig. 6, the top adjusting thumb nut being removed. Fig. 8 is a horizontal section taken on the line 8—8 of Fig. 1. Fig. 9 is a vertical section showing certain details, taken on the line 9—9 of Fig. 8. Fig. 10 is a horizontal section taken on the line 10—10 of Fig. 9. Fig. 11 is a section of certain parts similar to Fig. 9, but certain of the parts shown in Fig. 9 being shown in full. Fig. 12 is a section taken on line 12 of Fig. 10. Fig. 13 is a section taken on line 13 of Fig. 10. Fig. 14 is a vertical section of the mechanism box taken on the line 14—14 of Fig. 8. Fig. 15 is a section taken on the line 15 of Fig. 14. Fig. 16 is a vertical section taken on the line 16—16, of Fig. 14. Fig. 17 is a section taken on the line 17—17 of Fig. 14. Fig. 18 is a detailed view of certain parts of the tripping mechanism. Fig. 19 is a similar view, showing the parts in a different position. Fig. 20 is a vertical section taken on the line 20—20 of Fig. 1. Fig. 21 is a vertical section taken on the line 21—21 of Fig. 1. Fig. 22 is a section taken on the line 22—22 of Fig. 8. Fig. 23 is a section taken on the line 23—23 of Fig. 22. Fig. 24 is a section taken on the line 24—24 of Fig. 10. Fig. 25 is a detail view showing certain parts of the reciprocating mechanism, shown in horizontal section in Fig. 8. Fig. 26 is a detail view showing means for holding the rheostat adjusting lever in position. Figs. 27 and 28 are detail views, illustrating the method of adjusting the position of the diamond or other body to be ground or polished, in the machine. Fig. 29 is a detail view of one of the gears and pawl and ratchet mechanism, shown in Fig. 14. Fig. 30 is a section taken on the line 30—30 of Fig. 29. Figs. 31 to 34 inclusive illustrate one method of positioning the diamond or other body to be ground or polished in the machine. Figs. 35 to 38 inclusive illustrate another method of positioning the diamond or other body to be ground or polished, in the machine. Figs. 39 to 42 inclusive illustrate still another method of positioning the diamond or other body to be ground or polished, in the machine.

A grinding operation is ordinarily commenced on the rougher bands of a polishing lap, and shifted, as the operation proceeds, from one band to another till finally completed on an exceeding true and smooth band,—the finishing band,—which, when a machine is used, should have a slightly higher level than the other bands of the grinding surface. It is very useful to have a dial and pointer, or something of the kind, which shall show at all times the stage of the grinding operation: so that the operator, without having to examine the stone being ground, may know on what portion of the grinding surface the operation should proceed. In addition, it is desirable,—1st,—in order to relieve the memory of the operator and so prevent mistakes, that the pointer, at the completion of each operation, should occupy the same position,—irrespective of the kind of operation and the extent or amount of grinding done. 2nd.—that the grinding dial should at all times show, by direct reading, the amount, to within a small fraction of a thousandth of an inch, which remains to be ground off before the operation is complete. 3rd.—that the fixed point of reading of the completed operation should be unaffected by the various adjustments and settings in the machine; for instance—the adjustment compensating the inaccuracy of cementing the stone in its arbor, the adjustments providing for different angles and number of facets and for different heights of table above the girdle, the adjustment compensating for the relatively changed positions of the surface of the finishing band due to its wear or the wear of its supporting surfaces and also the wear of the supporting parts of the stone-containing arbor, forming part of the machine. 4th,—that the dial or pointer should be readable on both sides of the machine, so that a foreman operator, in passing, may become aware of the stage of operation and progress in a series of machines.

It is also desirable that there be a ready and practical means to readjust with extreme precision, the distance of the stone-containing arbor from the finishing-band of the grinding surface; otherwise, the scale would become incorrect and the amount ground away would be more or less than required. This is owing to one or more of the following causes:—to the wearing away of the finishing-band of the grinding-surface, or its transference to another position of different level;—to the wear of the supporting surface, or its grinding surface;—or to the wear of the supporting parts of the stone-containing arbor forming part of the machine. It is very desirable that this readjustment of distance be made in a manner not affecting and rendering necessary the readjustment in the machine, and for this reason machines have been hitherto readjusted by adjusting the machine bodily relatively to the grinding surface, or, readjusting the position relatively to the body or stand of the machine, of the arm extending over the grinding surface and on which the stone-containing arbor is in some manner supported. These methods have been found difficult and impracticable, not only on account of the extreme precision of distance, but also because the finishing-band, in addition to being smooth and plane, must also be truly at right angles with the axis on which the stone-containing arbor must yet rotate while having its axis inclined to the grinding surface in order that the grain of the facet of the stone being ground may be in proper relation to the motion of the grinding-surface. In this machine the readjustment is made directly over the finishing-band of the grinding-surface, in the aforementioned axis at right angles to that surface, and in a manner not affecting any other adjustment or scale-reading whatsoever.

Referring to the various drawings, more particularly to Fig. 1,—1 represents a rotary polishing lap, the upper surface of which acts as a grinding or polishing surface for grinding or polishing the stone or other body to be ground or polished. The lap 1 is adapted to be rotated by the spindle 2 as its axis. The diamond is illustrated at 3, (see also Figs. 5 and 6), the diamond being cemented in or otherwise fastened to an arbor 4. The arbor 4 is secured in a hollow spindle or dop spindle 5 by means of a set screw 6. A pin 7 passes through the arbor 4 and enters a slot 8 off center in the spindle 5, in order that the arbor will always be placed in the spindle at the proper angular position relative to the index flange 11 hereinafter described. Spindle 5 is carried in a sleeve 9, being sustained therein by a spring-washer 10, coöperating with an index flange 11 on the top thereof. The sleeve 9 is provided with a collar 12, engaged by a two-part flange-nut 13, the flange-nut 13 being threaded upon a bushing 14, held in a dop or carrying-head 15. A set screw 16, having a tapered end is threaded into the carrying head 15 and when screwed inwardly, its tapered end acts on a member 17 to securely clamp the dop-spindle sleeve 9 and hold it rigid with respect to the carrying head 15 (see also Fig. 7). A screw 18 prevents the sleeve 14 from turning. By loosening the set screw 16, and operating the flange-nut 13, the dop spindle sleeve 9, together with the arbor 4 and stone 3 carried thereby, may be raised with respect to the carrying head 15, as desired. The carrying-head 15 is provided with an extension 19, sliding in an arcuate guide 20. A stud 21, secured to the head 15, passes through the arcuate guide, and is provided with a flange-nut 22 for the purpose of locking the head 15 in any of its various positions with respect to the arcuate guide 20 (see also Fig. 4). In order that index flange 11 may be locked in any of its adjusted positions, it is serrated at 23 upon its underneath outer edge, and a locking lever 24, pivoted with respect to the dop-spindle sleeve 9 on the extension 25 on a collar 28, has its outer end adapted to engage the serrations at 23 to lock the index flange 11 in its adjusted position, locking lever 24 being pressed upwardly by means of a plunger 26, acted upon by a spring 27, carried by a collar 28 upon the dop spindle sleeve 9. A latch lever 29, also pivoted to the collar 28 has a member 30 adapted to press downwardly and withdraw the catch 24 from the serrations at 23 to unlock the index flange 11. The locking lever 24 and member 30 are so shaped that when the latch lever 29 is drawn to the extreme downward position, the locking lever 24 will be locked in its withdrawn position.

The bushing 14 is provided with two upwardly extending lugs 14' (see Figs. 6 and 7) between which the extension 25 is free to slide; but which extension 25 prevents rotary movement of the sleeve 9 with respect to the bushing 14.

Also carried by the carrying head 15 is a bushing 31, in the top end of which is a screw threaded, and adjusting flange sleeve 32, having a setting scale periphery at 33. The flange sleeve 32 carries a spindle 34, having an enlarged portion 35 below the flange sleeve 32 and a head 36 secured thereto above the sleeve 32, a spring-washer 37 being interposed between the enlarged portion 35 and the head 36, in order to take up all wear between the parts. The enlarged portion 35 has a key way to prevent its rotation with respect to the bushing 31, while permitting its vertical adjustment therein, upon the operation of the flange sleeve 32. A screw 38 having a key shaped end, operates through the side of the carrying head 15 and bushing 31 to prevent rotation of the spindle 34. The lower end of the spindle 34 carries a head 39, which, in turn, has slidably mounted therein, a setting indicator or pointer 40. The setting indicator may be moved transversely by means of a gear 41, engaging a rack 42 on the indicator 40, the gear 41 being turned by a knob 43. The gear 41 is provided with a flat face, as shown in Fig. 5, which flat face is adapted to be engaged by a spring pressed plunger 44, so that when the pointer 40 is withdrawn from the stone 3, it will be sustained in such withdrawn position. The pointer 40 is designed, when the reading on the setting scale is zero, to point to the center of the arc formed by the arcuate guide 20,—or, in other words, the center of the dop-arc, and any adjustment of the setting indicator 40, by turning the knob 43, does not alter this condition. The arcuate guide 20 is carried upon the lower end of a hollow spindle 45 (see Fig. 14), which is encircled by a main sleeve 46 passing vertically through a carrying frame or mechanism box 47. The main sleeve 46 is prevented from rotating in the mechanism box by means of a feather 48, engaging a slot 49 in the main sleeve 46. The hollow spindle 45 has passing therethrough a spindle 50, having an enlarged head 51 at its upper end and a nut 52 screw threaded upon its lower end for the purpose of holding the spindle 50 within the hollow spindle 45, the washer 53 slidably feathered on the spindle 50 being interposed between the nut 52 and the hollow spindle 45. A pin 54 passes through the head 51 and main sleeve 46 for the purpose of securing the spindle 50 to the main sleeve 46. Screw threaded upon the upper end of the main sleeve 46 is an adjusting flange sleeve 55, having thereon an operation scale 56. The threads of the flange sleeve 55 are pitched ten to the inch, as are also the threads on the flange sleeve 32, so that one turn of these sleeves will move their respective adjusting parts one-tenth of an inch, and hundredths and thousandths of an inch may be easily scaled off on the scales 56 and 33 respectively. The upper end of flange sleeve 55 is engaged by a collar 57, screw threaded upon and secured to a sleeve 58 by means of a screw 59. A screw rod 60 is positioned within the sleeve 58 and has a flange 61 engaged between the collar 57 and upper end of the sleeve 58. The screw rod 60 has screw threaded upon its lower end a hollow spindle 62, enlarged at its lower end at 63 (see also Fig. 15), the enlarged portion being prevented from a rotative movement by having a slot therein engaged by the feather 48. A series of springs 64 and piston plungers 65 operate between the end of screw rod 60 and the enlarged head 51, tending to separate the two. Screws 66 hold the feather 48 in place in the frame, and the hollow spindle 45 is provided with a spiral recess 67 containing a lubricant.

The mechanism box 47 is provided with stuffing boxes 46' on each side thereof where the main sleeve 46 forming part of a main sliding spindle carrying the dop, enters the mechanism box. These stuffing boxes contain suitable soft cleaning material to clean dust and dirt from the spindle or sleeve 46 where it enters and bears in the box or frame 47 to prevent the dust and dirt from affecting the movement of the spindle through the frame 47.

One portion of the outer lower face of the hollow sleeve 62 is provided with a vertical rack 68, engaged by a segment 69, having an integral lever 70 pivoted at 71 to the frame of the mechanism box. The turning of the screw rod 60 raises and lowers the sleeve 58 along with the collar 57, the flange sleeve 55, the main sleeve 46, the spindle 50, the hollow spindle 45, the carrying head 15, and the parts carried thereby, including the stone to be ground, all with respect to the hollow spindle 62 and consequently with respect to the pivot 71 and lever 70. Likewise the turning of the flange sleeve 55 raises and lowers the main sleeve 46 along with the spindle 50 and thereby the carrying head 15 with the parts carried thereby, all with respect to the pivot 71 and lever 70.

It will be seen that if the segment 69 be turned in a direction to force the rack 68 downwardly, the main sleeve 46, together ith all the parts contained therein and the carrying head 15, with the stone to be ground, will be carried downwardly toward the polishing lap 1. In order that this may be done, the segment 69 is engaged by a segment 72, having integral therewith a segment 73, engaging a pinion 74, the pinion 74 having jaws 75 projecting laterally therefrom, adapted to be engaged by jaws 76 (see Fig. 22) integral with the shaft 77, passing through the outside cover of the mechanism box 47, and which shaft 77 has secured to the outside thereof an arm 78, carrying a screw 78' (see also Fig. 1) on which is adjustably mounted a weight 79, by turning the head 80 of the screw 78'. Thus, the action of gravity on the weight 79 rotates or tends to rotate the gear 74, counterclockwise, which, acting through the segments 72 and 73, rotates or tends to rotate the segment 69 counterclockwise, as viewed in Fig. 14, and thereby forces or tends to force the stone carrying parts downward toward and against the polishing lap 1. It will be seen that if the arm 78 is near the vertical position, the action of gravity in this respect will be far less than if the arm 78 is in a horizontal position, as shown in Fig. 1. In operation, when the grinding of a stone starts, the arm 78 will be positioned near to the vertical, and as the grinding proceeds, the arm 78 will move toward the position shown in Fig. 1, so that as the grinding proceeds, the weight 79 will force the stone against the polishing lap with greater force, as desired. The action of the weight in this respect may be adjusted by turning the thumb head 80, so as to adjust the position of the weight with respect to the short shaft 77, to suit the size of stone and stage of operation. In order that this varying force with which the stone is pressed against the polishing lap may not be affected by the weight of the stone carrying parts moving toward the lap, through the mechanism box 47, and means may be provided tending to force the spindle 62 upwardly against the action of the weight 79, in order that the readings on a grinding scale hereinafter described may be more accurate, the weight of these moving parts is slightly overbalanced by means of a spring 81, acting upon the lever 82 at 83, the lever 82 being pivoted at 84 and having its long arm provided with teeth 85, engaging the rack 68, so that the spring 81 tends to raise the stone carrying parts movable with respect to the mechanism box 47.

The movement of the dop carrying a stone toward the grinding-surface must be slow; otherwise, the stone or the grinding-surface, or both, may be injured; therefore the dop or stone carrying parts should be so mounted and connected that other than a slow approach is impossible. Machines have been constructed having hydraulic or pneumatic mechanism for this purpose, but have proven unsatisfactory. In this machine, for the aforesaid purpose, mechanism has been devised and adapted dependent for its effectiveness upon the resistance offered by mass to alternate acceleration and retardation, and where friction is reduced to a minimum, so that to a slow rate of movement there is but little resistance. Therefore, in order that before the grinding of the stone is started, and the stone is moving downwardly with its grinding parts toward the polishing lap, these downward movements may be satisfactorily retarded, the pinion 74 has secured thereto a gear 86, meshing with a stud gear 87, which meshes with a pinion 88, which has secured thereto a gear 89, meshing with a pinion 90, carried loosely on its shaft. Affixed to the pinion 90 is a ratchet wheel 91, adapted to be engaged by a spring pressed pawl 92, carried by a gear 93, which meshes with a pinion 94, secured to a gear 95, which meshes with a pinion 96. The details of the ratchet wheel 91 and spring pressed pawl 92 are clearly shown in Figs. 29 and 30. The pinion 96 carries an eccentric 97 (see also Fig. 16), which eccentric operates in the vertical slot 98 in a weight 99, pivoted at 100, so that as the stone and its carrying parts move toward the polishing lap, the gear 96 is rapidly revolved thereby, causing a rapid reciprocation or oscillation of the weight 99, which, because of its inertia, retards the approach of the stone toward the polishing lap. The segment 73 also acts to drive the pinion 101, which has secured thereto a gear 102, meshing with a pinion 103, having secured thereto a gear 104, meshing with a pinion 105, which has a shaft extending out through the frame or mechanism box 47, and has secured thereto a pointer 106, coöperating with a dial or grinding scale 107 (see also Fig. 17), so that, as the stone to be ground moves toward the polishing lap 1, the amount of such movement is accurately measured to one one-thousandth of an inch upon the dial or scale 107. A duplicate pointer 106', coöperating with dial scale 107' is also operated by the gear 105, so that the movement of the stone toward the polishing lap, and consequently the progress of the grinding operation may be watched from either side of the machine. A gear 108 also meshes with pinion 105, and a spring 109 tends to rotate the gear 108 in the opposite direction from which it is rotated by the pinion 105. This takes up all the back lash between the various gears. In the top of the frame or mechanism box 47 is an oil drip 110.

It will be seen that by raising or rotating the arm 78, its shaft is turned, thereby turning the pinion 74 clockwise, as shown in Fig. 14, and consequently rotating the segment 69 clockwise, as shown in Fig. 14, thereby raising the stone carrying means and stone away from the polishing lap. This movement, however, does not reciprocate or oscillate the weight 99, because when the pinion 90 is rotated in this reverse direction, the teeth of ratchet wheel 91, which is secured to the pinion 90, slip under the spring pressed pawl 92, so that the gear 93 is not rotated and consequently, the weight 99 is not reciprocated.

In addition to a "grinding-scale" 107, it is useful to prevent further grinding than is required. In other words, to provide a means preventing the further decrease of the distance of the stone-containing arbor from the grinding surface. It is advantageous that this stop should have but one position so that no adjustments be necessary to suit the different amounts of grinding required. It is also desirable, when the completion stage is arrived at, that then the machine automatically increases the distance between the stone-containing arbor and the grinding-surface; otherwise, this stage would be indefinite and dependent on the extent of time of contact with the grinding-surface. In other words, that the machine be provided with an automatic trip acting upon the completion of a grinding operation as determined by a stop preventing the further decrease of distance of the stone-containing arbor from the grinding-surface. In grinding diamonds, the arrest of the grinding operation for the several facets must be uniform to an extreme degree. In this machine, to attain great precision of stopping position, that member of the tripping mechanism, to be affected in order to effect the tripping, has a magnified movement toward the member which affects the aforementioned member, which effects the trip. Also, the principle and arrangement of the tripping mechanism is such that an exceedingly small force acting through an exceedingly small distance is required to operate the aforementioned member which effects the trip. Moreover, as in this machine, the tripping, or, in other words, the completion of the grinding operation, always occurs at a fixed point of reading on the grinding-scale, there is provided an adjustment, taking care of the wear of parts of the machine, so that the tripping may always occur at this fixed point of reading.

In order that the stone may be thus automatically withdrawn from the polishing lap whenever a face or facet thereon has been ground to the predetermined or desired extent, the following mechanism is provided for causing the lever 70 to move in a clockwise direction, to raise the stone carrying mechanism. The lever 70 has a dependent integral arm (see also Figs 16, 18 and 19), to which is pivoted at 111 a lever 112. The short upper arm of the lever 112 carries pivotally mounted thereon an abutment 113, upon the upper end of which rests one end of a compression spring 114, the other end of the compression spring being seated in a cup-shaped depression in the lever 70. Integrally attached to the lever 112 is a segment 115, the teeth of which engage a pinion 116, journaled on the lever 70, at 117. The pinion 116 has fixedly secured thereto a segment 118, the teeth of which mesh with a pinion 119, also journaled on the lever 70. Also journaled on the lever 70 at 120 is a lever 121, having a short arm 122, upon which is pivoted a member 123, weighted at its lower end at 124. The lever 121 is also provided with an integral upward extension 125, adapted to be engaged by catch 126, secured to the pinion 119. Also journaled on the lever 70 is a further lever or trip device 127, pivoted at 128, having a long arm 129 adapted to engage the end of the lever 121, to hold the said long arm from being pulled upwardly by the action of weight 124, suspended from short arm 122. The trip device 127 is also provided with a short arm 130, adapted, when the grinding of a face or facet of a stone has progressed to the desired point, to engage a pin 131, screw-threaded into a pivot arm 132, which arm is held against an adjustable stop 133, by means of spring 134, the pivot arm 132 being pivoted at 135. Also screw-threaded in the mechanism box 47 is an adjustable stop 136, adapted to be engaged by the long arm of lever 112, when the long arm 129 slips off the lever 121.

The operation of this trip mechanism is as follows:—As the grinding of the face or facet of the stone progresses, the main sleeve 46, together with its contained parts, among which is the rack 68, moves downwardly or toward the polishing surface. This causes a gradual rotation of the segment 69 counterclockwise, as viewed in Figs. 14, 18 and 19. This causes the long lever arm 70 to be raised, carrying with it the parts 111 to 128 inclusive. This movement continues until the arm 130 engages the pin 131, thereby causing an extremely slight movement of the trip device 127 about its pivot 128, so that the arm 129 slides off the lever 121, thereby permitting the weight 124 to rock the lever 121 counterclockwise, and off of the catch 126, permitting the spring 114 to act between the levers 70 and 112, to cause the lever 112 to move about its pivot. That is, when the parts are set, as shown in Fig. 14, the spring 114 acts on the lever 112, tending to move the same counterclockwise. This causes the segment 115 to act upon the pinion 116, and segment 118, tending to move the same clockwise, and the segment 118 tends to move the pinion 119 and catch 126 counterclockwise against the upright arm 125, so as to hold the lever 112 in the position shown in Fig. 14, the engaging surfaces between the arm 125 and catch 126 being so shaped that immediately the arm 129 slips off of lever 121, the action of the spring 114 aided by the weight 124 easily rocks the lever 121 to release the catch 126. And when the arm 125 so moves off of the catch 126 by the action of the spring 114 and weight 124, as above explained, the spring 114 is permitted to oscillate the lever 112 about its pivot, so that the long arm of the lever 112 engages the stop 136, whereupon the spring 114 acts to pull the lever arm 70 downwardly, thus rotating the segment 69 in a clockwise direction, to raise the rack 68 and parts carried thereby, including the stone being ground, so that the stone is withdrawn from the polishing surface. That is, when the trip device 127 is operated by coming into engagement with the screw pin 131, the spring 114 acts to force the parts into the position shown in Fig. 18.

In order to reset the parts as shown in Fig. 14, from the position shown in Fig. 18, the weight 79 or arm 78 is grasped by the hand and turned, as far as possible, in a clockwise direction, as viewed in Fig. 1. The extent of this movement is determined by the contact of the lever 70 with the fixed pin 137. That is, the stone carrying parts are given a still further movement away from the polishing surface, so that the side of the segment 115 engages the fixed pin 137, causing a reverse movement of the segment 115, and also a reverse movement of the lever 112, so as to compress the spring 114. At the same time the member 123 engages a fixed pin 138, as shown in Fig. 19, in such a manner that the weight 124 tends to rock the lever 121 in a reverse direction, so that by the time the catch 126 is reversed, the extension 125 is brought thereunder. This reverse movement of the lever 121 also permits the long arm 129 on trip device 127 to be brought into engagement with and catch the long arm of lever 121, in order to lock the same in this position (see Fig. 19). A stop 139 limits the movement of trip device 127 in this reverse direction, a stop 140 limits the movement of the lever 121 in the counterclockwise direction, and a stop 140' in clockwise direction. Trip device 127 is so weighted that its long arm tends to rotate in front of long arm of lever 121, as soon as a sufficient reverse movement is given to the latter. The parts then being as shown in Fig. 19, are ready for another grinding operation and when the hand is released from the arm 78 or weight 79, the stone carrying parts gradually descend, retarded by the weight 99, and will act to withdraw the stone in a similar manner when the grinding has again progressed to the desired predetermined extent. Toward the extreme portion of the resetting movement, a pin 250 on gear 181 (see Fig. 22) engages a lever arm 251, pivoted at 252 and acted upon by a spring 253 to normally hold it against a stop 254. When the pin 250 engages the spring pressed lever 251, as shown in dotted lines, it acts to compress the spring 253, whereupon, upon the release of the weight 79 or lever arm 78 by the hand of the operator, the spring 253 moves the arm 78 to the left hand side of the vertical, as viewed in Fig. 1, whereupon the weight acts to force downwardly the stone carrying parts to bring the stone in engagement with the polishing surface.

In order to compensate for the weight of lever arm 70 and the trip mechanism parts carried thereby, a spring 141 engages on one end of an adjustable abutment 142 and on its other end a loose arm 143, the other end of which arm engages a pin 144, integral with the segment 69 and lever 70, so that the spring 141 tends to raise the lever 70 about the pivot 71, the spring being of sufficient strength to balance the weight of the arm 70 and trip mechanism parts carried thereby.

In polishing gems, more particularly polishing diamonds, as the polishing or grinding operation proceeds, it is desirable to shift the stone transversely to the polishing lap, in order to bring it into engagement with a different surface or band on the polishing lap. A grinding operation is commenced on the rougher portions of the grinding-surface and if the stone be given a slow reciprocative motion, crosswise to the motion of the grinding-surface, then time is saved in grinding and also the grinding-surface improved and sustained in truer condition. As the grinding proceeds it is necessary to shift the stone laterally so that the grinding may be on the adjacent bands, but before shifting to a new position, the grinding-pressure should be relieved, otherwise the stone may be damaged, as also the grinding-surface. For this purpose the following mechanism is provided. The mechanism box 47 is supported upon a guide bar 145 (see Fig. 4). The mechanism box 47 is provided with a strip 146 at the lower edge of its inside face, and with a screw 147, for forcing the same into close engagement with the guide bar 145. The mechanism box is slidable longitudinally or parallel to the polishing surface, along the guide bar 145. The guide bar 145 is slotted longitudinally and contains therein bar 190, longitudinally movable in the guide bar, but held fixed with respect to the guide bar 145, unless it is desired to reciprocate the stone over the lap, as will be hereinafter more fully explained. The bar 190 is cut away at 148 (see Fig. 8) and has secured therein, as by pin 155, a screw 149, on which is carried a collared nut 150, having on one end a miter gear 151, meshing with a miter gear 152, secured to the shaft 153, journaled in the mechanism box 47 and the flange bearing 148 (see also Figs. 9 to 13). The collars on nut 150 engage a projection 154 on the mechanism box, so that upon the turning of the gears 151 and 152, the mechanism box is forced to slide horizontally along the guide bar 145.

Secured to the other end of shaft 153 is a driven member 167 having opposite arms, each of which carry a roller 166 (Fig. 10). Journaled in a frame piece, secured to the mechanism box 47 by two screws 161, (Fig. 1) is a driving member 158, having opposite arms, each of which carry a roller 162 (Fig. 9). Driving member 158 has a flange 159 and also a projection 157, on which is secured the knurled knob 156. Slidably mounted on the shaft 153 and located between the bearing 184 (secured by screws 185 to the mechanism box 47) and the driven member 167 is an intermediate member 160 which has a flange 164 integral with a pair of oppositely disposed cams 163 (Fig. 1), the transverse extremities of which form pockets 165 (Fig. 11), for the rollers 166 carried on the driven member 167. Surrounding the shaft 153 is a friction device comprising a series of friction rings 182 alternated with a series of friction rings 183, all contained in a tubular extension of bearing 184. Rings 182 have projections 186 engaging slots in the tubular extension of bearing 184 (see also Figs. 12 and 13) and rings 183 are provided with slots engaging the feathered portions 187 of the shaft 153. The rings 182 and 183 are pressed together by compression spring 188. Rings 182 cannot rotate with respect to mechanism box 47 while rings 183 are forced to rotate with shaft 153. Pivoted to the frame pieces at 168 is a bell-crank 169, one arm of which is forked at 170 and abuts the flanged portion 164 of the intermediate member 160, while the other arm abuts a rod 171, slidably mounted in the mechanism box 47. The rod 171 also abuts a lever 172 (see Fig. 22), pivoted at 173. A compression spring 174 presses the intermediate member 160 against the rollers 162 of the driving member 158 (see Fig. 9) by means of the lever 172, the rod 171 and the bell-crank 169. The upper end of the lever 172 has pivoted thereto a pawl 176, pressed upwardly by a spring-pressed plunger 177 against a stop 178. Pawl 176 is adapted to engage the teeth of a ratchet wheel 179, having secured thereto a pinion 180, which meshes with gear 181 secured to the jaws 76 of the shaft 77 (see also Fig. 17). The two arms carrying rollers 162 of the driving member 158, and the two arms carrying rollers 166 of the driven member 167 are equi-distant from the axis of shaft 153, and in the normal position (shown in Figs. 8 to 11 inclusive) are disposed at right angles to each other around the shaft 153 (see Fig. 24): Moreover, there is a uniform gap on each side of each arm of such extent, that, assuming the shaft 153 to be stationary and movement in either direction be imparted to the driving member 158, then the sides of those arms will not contact until the intermediate member 160 has almost contacted with bearing 184. Pin 175 (Fig. 22) merely restrains the position of lever 172 and takes no part in the action of the mechanism.

Therefore, when knob 156 is turned in either direction, the rollers 162 carried thereby act upon the cam faces 163, and on account of the resistance to rotation of shaft 153 afforded by its surrounding friction device, force the member 164 inwardly along the shaft 153, thereby causing the operation of the bell crank 169, to force the rod 171 inwardly against the action of spring 174, and cause the pawl 176 to engage the teeth of ratchet-wheel 179 and rotate the gear 181. The rotation of gear 181 lifts the weight 79 and rotates the pinion 74 and segments 73, 72 and 69, and slightly raises the rack 68 and accordingly also raises the main sleeve 46 and the stone carrying means, whereby the stone is slightly withdrawn from the polishing surface. This action occurs irrespective of the direction of the turning movement given the knob 156. As the movement of the knob 156 is continued, the arms of the driving member 158 engage the arms of the driven member 167 (see Fig. 24) so that any further rotation of the driven member 167, and, consequently, the shaft 153, whereby miter gears 152 and 151 are rotated, causing the collared nut 150 to be moved along the screw 149, and, consequently, the mechanism box together with all the stone carrying means are moved laterally over the polishing surface as far as desired, with the stone still held in slightly raised position, until the proper band or position on the polishing lap for the further polishing of the stone is reached. Upon the release of the knob 156, the spring 174 acts to return the intermediate member 160 and the driving member 158 to their original positions, relative to the driven member 167, and the pawl 176 returns to its original position, permitting the stone to again contact with the lap 1. If it is desired to move the mechanism box and stone in the opposite direction over the polishing lap, the knob 156 is turned in the opposite direction and the parts will operate in a similar manner.

It is also desirable in the polishing of gems and particularly in the polishing of diamonds, that the stone be given a slight reciprocation over the polishing surface during the polishing operation at certain stages thereof, and that the amplitude and rate of these reciprocations be varied in accordance with the progress of the polishing or grinding operation, and without having to stop the polishing operation and while the operator is continually watching the stone and the grinding surface in engagement with it, and so that the amplitude of the reciprocations may be varied by gradations infinitesimally small until no reciprocation whatever will take place. For this purpose the following mechanism is provided. The bar 190 has journaled therein a pin 191, extending from a small bell crank 192 (see Figs. 8, 20, 21 and 25), which bell crank is slotted at 193 and in which slot there is positioned an anti-friction roller 194, carried upon an upright vertically adjusted bar 195, which bar is adapted to be adjusted vertically by means of flanged sleeve 196, surrounding the lower end of the bar 195, by means of nut 197 and screw-threaded in a frame on the guide bar 145, at 198. The flange sleeve 196 is provided with a scale 199, in order that the height of the roller 194 may be accurately and closely adjusted. Bell crank 192 is also slotted at 200, and in the slot 200 is positioned an antifriction roller 201, carried eccentrically upon a disk 202, which disk is integral with shaft 203, having secured thereto a miter gear 204, meshing with a miter gear 205, on the back face of which is a bevel gear 206, meshing with a bevel pinion 208 on shaft 209 (see also Fig. 3), which shaft at its lower end has secured thereto a bevel gear 210, driven by a bevel pinion 211, driven by an electric motor 212. Accordingly, upon the rotation of the motor 212, the disk 202 is caused to rotate (see Fig. 25) so that the roller 201, operating in the slot 200 rocks the bell crank 192 about the center of the roller 194, being held in fixed relation to the guide bar 145, the pin 191 will be forced to reciprocate longitudinally, carrying with it the bar 190, and, consequently reciprocating the mechanism box 47, with the stone carrying means, thereby causing a reciprocation of the stone over the polishing surface. Upon turning the flanged sleeve 196, the roller 194 may be moved to various distances from the center of the pin 191, so as to vary the amplitude of these reciprocations. That is, if the center of roller 194 and pin 191 be made to coincide, no reciprocation of the stone will take place, but, as the bar 195 is screwed upwardly, carrying with it the roller 194, so that the center of the roller 194 is moved away from the center of the pin 191, reciprocation of the stone will take place, the amplitude of which reciprocations will be increased the farther the center of roller 194 is moved away or above the center of pin 191.

In order to vary the speed of these reciprocations, means are provided for varying the speed of the motor which comprises a rheostat at 213, having contact points at 214 (see Figs. 2 and 3), over which contact points there sweeps a contact arm 215, carried by a segmental gear 216, meshing with a stud gear 218, operated by the pinion 219, carried upon the lower end of the shaft 220, upon the upper end of which shaft is a miter gear 221, meshing with a miter gear 222, upon the shaft 223, having fixed on its outer end an operating handle 224, with a co-operating scale 225 (see Fig. 1). Accordingly, as the handle 224 is moved, the contact arm 215 is caused to sweep over the contact points 214, and thus vary the resistance in the motor circuit in a well-known manner, and, accordingly, vary the speed of the reciprocations of the stone over the polishing surface. In order that the operator may know at what point the handle is being turned, without looking at the same, but by touch, there is secured to the opposite end of the shaft 223 a disk member 226 (see also Fig. 26), having over a portion of its periphery recesses adapted to be engaged by a roller 227, carried upon an arm 228, pivoted at 229 and pressed upwardly by spring pressed plunger 230, so that the roller 227 is caused to engage the recesses and projections of disk 226 with a spring pressure. As the operator moves the handle 224, to cause the contact arm 215 to sweep from one contact point 214 to another, the spring pressed plunger 230 at first tends to retard this movement, but upon the roller 227 passing over the apex of the next projection, tends to cause the rotation of the disk 226, so as to bring the contact arm 215 into contact with the next contact 214. In this way the operator may tell by touch just when he has reached the next, or any desired step of resistance of the rheostat, and, consequently, any desired speed of reciprocation of the stone over the polishing surface.

In order that the stone 3 may be easily lifted or withdrawn from the polishing lap 1, for inspection, without stopping any of the apparatus or interfering with any of the adjustments and in such a manner that it can be readily replaced upon the lap for continuing the polishing operation while the apparatus is still running and without making any new adjustments, the following arrangement is provided.

The longitudinal guide 145 forms part of a frame piece 145' (see Figs. 2, 3, 4 and 8). This frame piece 145' is journaled to revolve about a horizontal axis, parallel to the plane of the polishing surface, by means of pivot pins 231 and 232, in the main frame 233, secured rigidly to a table or other suitable device 234, by means of screws 235, the pin 231 being screwed into the frame, in order that it may be easily withdrawn and inserted for the purpose of putting the frame 145' into position, and in order that the pin 231 may be tightened up to form a tight bearing for the frame piece 145', a lock nut 236, being secured thereon. On an upright projection 237 on frame piece 145' is pivoted a lever 238, having a handle 239. The lever 238 is adapted to engage a short lever 240 on a rocking shaft 241, journaled in the upright projection 237, at the other end of which rocking shaft a short lever 242 is adapted to engage a pin 243, slidably mounted through the frame piece 145', having its lower end adapted to engage the outer end of lever 244 (see also Figs. 20 and 21), which is normally pressed upwardly by a spring pressed plunger 245, in the main frame 233. The lever 244 is pivoted to the main frame at 246, and is provided with a hooked end 247, adapted to engage the ends of a lug 248 when normally pressed upwardly by the spring pressed plunger 245, the lug 248 being integral with the frame piece 145' and guide 145, so that when the hooked end 247 engages the lug 248, it is impossible to rotate the frame piece 145' and parts carried thereby upwardly as shown in Fig. 3, the same being locked by the engagement of the hooked end 247 with the lug 248. However, when the handle 239 is thrown clockwise, as indicated in Fig. 3, it acts upon the lever 240 of the rocking shaft 241, to cause the lever 242 to press the pin 243 downward, which forces the lever 244 out of engagement with the lug 248, and thereupon a further movement of the handle 239 in a clockwise direction, as viewed in Fig. 3, causes the frame piece 145' and parts carried thereby to be rotated in clockwise direction, as viewed in Fig. 3, so as to bring the parts in position as shown in Fig. 3. This movement may be continued until the other end of the lug 248 abuts the outer portion of the hooked end 247 of the lever 244, whereupon the parts will be maintained in the position shown in Fig. 3. A reverse movement of the handle 239 will bring the parts back in normal position with the stone 3 upon the grinding surface and the spring pressed plunger 245 will press the hooked portion 247 of lever 244 into engagement with the lug 248, so as to lock the parts in normal upright position, as shown in Figs. 1, 4 and 20.

In this connection it will be noted that the stone 3 is carried at one side of the plane, passing through the axis of the revoluble frame 233 and perpendicular to the polishing surface, so that it is not necessary to lift the frame as a whole, or to change any of the adjustments in order to raise the stone for inspection in this manner, as illustrated in Fig. 3.
It will be seen referring more particularly to Fig. 14, that the parts 46, 45, 50, 58, 60, 62, &c., all form what may be termed a main spindle, slidably mounted in the frame 47, to move toward the lap, and which spindle carries the stone to be polished in engagement with the lap by means of the carrying head 15 and its associated parts. This spindle may be considered as being divided into three parts, namely, a lower part comprising parts 46, 45 and 50, another part 58, and a third part, 62,—each of which three parts is adjustable, one with respect to the other in series relation, and that the flange sleeve 55 and screw 60 serve respectively as means for adjusting the lower or carrying part with respect to the second part of the spindle, and for adjusting the third part 62 with respect to the second part 58 of this main spindle, and that the operation of the adjusting flange sleeve 55 acts to move the stone into different positions with respect to the polishing lap, without affecting the tripping mechanism or grinding indicator 106. The springs 64 act to take up back lash between said three spindle parts. When the scale 56 reads at zero, the center of the arc of the arcuate guide 20 lies in the plane of the polishing surface of the lap 1. It will be understood that when the third part 62 of the said named spindle is moved a predetermined distance toward the polishing lap, the tripping mechanism will be affected to withdraw the stone from the polishing lap as above explained.

The general operation of the machine is as follows:

The mechanism box 47 is swung into horizontal position by means of the handle 239 for easy access to and manipulation of the arbor 4. Then, if the stone to be ground is not more than about one-eighth of an inch in diameter of girdle, the setting-scale 33 is placed at zero, by means of the flange sleeve 32, which brings the setting indicator 40 so as to point toward the center of the dop-arc or arcuate guide 20. The stone-containing arbor 4 is then placed in the dop-spindle 5 and secured therein by tightening the screw 6. The stone is then adjusted into position so that the girdle of the stone is in line with the setting indicator 40 while the setting scale is at the aforementioned zero position. This is effected as follows:—The setting indicator 40 is brought into position by means of the flange sleeve 32, near to, yet fully clear of the stone. The dop-spindle 5 is sustainedly unlocked by depressing the latch lever 29, and the dop-spindle sleeve 9 is unclamped by means of the screw 16. The stone-containing arbor 4 is adjusted longitudinally by means of the flanged nut 13 until the girdle of the stone is apparently in line with the setting indicator 40. The dop-spindle 5 is then rotated by means of its index flange 11, while the setting indicator 40 is brought, by means of the knob 43, close to the girdle of the stone; it will then be seen if further longitudinal adjustment of the dop-spindle 5 be necessary. After complete adjustment in this respect, the dop-spindle sleeve 9 is clamped by means of screw 16, the setting indicator 40 is put back in original position by means of the knob 43, the latch-lever 29 is put in original position and the index-flange 11 is rotated until the locking lever 24 snaps into the desired notch at 23. The dop or carrying head 15 should then be placed into correct position which depends on the operation required,—if a table, it is placed at the zero index, in which position the axis of the dop-spindle 5 is in line with the axis of main sleeve 46,— but if a facet,—then it will be at the index corresponding to the required angle of facets. The position of the dop 5 on the dop-arc 20 is changed by slightly slacking the flanged nut 22 sliding the dop or carrying head 15 into required position and retightening the flanged nut 22. The operation-scale 56 is then set by means of the flange 55, in accordance with calculated tables giving the proper distance for grinding facets of the required number and angle, or, for grinding a table at the required height from its girdle. The mechanism box is then swung into grinding position by means of the handle 239, and adjusted in lateral position by means of the knob 156, bringing the stone over the roughing-bands of the grinding-surface. The grinding pressure is then regulated by means of head 80, in accordance with the pressure required, which pressure may be determined by trial, starting with but little pressure (the weight 79 near the shaft 77) and increasing as the operation requires. The automatic trip is then set by turning the arm 78 clockwise, as viewed in Fig. 1, and then releasing the same. The amplitude of the reciprocating motion is regulated by the flanged sleeve 196; it should be greatest at the commencement of an operation, while the grinding is being done on the roughing-bands,—less toward the completion of the operation, and least, while the grinding is being completed on the finishing-band. The stage of the operation is always shown by the grinding-scale 107, the pointer 106 of which gradually approaches the zero, or completion of the operation. The rate of reciprocation is regulated by the handle 224, the rate may be known by trial:—it should be small when the amplitude is large,—greater when the amplitude is less, and greatest when the amplitude is least. At the completion of a grinding operation, the pointer 106 of the grinding scale will have arrived at the zero position when the automatic trip will act and withdraw the stone from the grinding-surface, in the manner explained above.

But if the stone to be ground is more than about one-eighth of an inch in diameter of girdle, then the setting scale 33 should not be placed at zero, but should be set in accordance with a displacement table giving the setting for the given diameter of girdle in accordance with the required number and angle of facets. The displacement of the setting scale 33 will affect the setting of the operation scale 56, therefore, when the setting scale 33 is not at zero, a different setting is required in the operation scale 56.

The calculated tables referred to may be prepared in advance, so that both the setting-scale 33 and the operation scale 56 may be directly set therefrom and these tables should cover the settings of all required numbers and angles of facets for the various diameters of girdle within the capacity of the machine. The reason for placing stones of more than about one-eighth of an inch diameter of girdle in a different position relative to the center of the dop-arc will now be explained, as also the calculation of the tables referred to. Referring to the three sets of diagrams, Figs. 31 to 34 inclusive,—Figs. 35 to 38 inclusive, and Figs. 39 to 42 inclusive, respectively, each diagram represents a stone to be ground in which $a$ $c$ and $b$ $d$ represent opposite facets. $f$ represents the axis of the stone-containing arbor, the axis of the dop-spindle 5 and the axis of the dop-spindle sleeve 9. $g$ $o$ represents the axis about which the dop or carrying head 15 is rotated in order to bring the grain of the surface of the facet in proper relation to the direction of motion of the grinding surface. $h$ $e$ represents the grinding surface. $g$ $e$ represents the dop-arc. $o$ represents the center of the dop-arc $g$ $e$.

In each set of diagrams the axis $f$ of the stone-containing arbor 4 is shown in the several positions, relative to the grinding surface $h$ $e$ and to the axis $g$ $o$, that are most usually required in the grinding of the facets of diamonds. In each instance in Figs. 31 to 34 inclusive, it will be seen that $2$ $x$ $o$ $b$ viz. $u$ is the narrowest possible width of band of grinding surface for grinding the facets $a$ $c$ and $b$ $d$ without having to shift the position of the axis $g$ $o$. This width of band $u$, if it be the finishing-band of the grinding-surface, must not only be a smooth, straight plane, but must also be truly at right angles to the axis $g$ $o$. An inaccuracy of but a small fraction of a thousandth of an inch would cause apparent defects in the facets ground thereon. It is exceedingly difficult, certainly impracticable, to obtain and sustain a finishing-band of the necessary width $u$ to grind the facets of moderate sized diamonds if located as in Figs. 31 to 34 inclusive. But it is practical to obtain and sustain a sufficient width of band $u$ to suit smaller stones, say not more than about one-eighth of an inch diameter of girdle, if placed into position as shown in Figs. 35 to 38 inclusive.

As shown in Figs. 35 to 38 inclusive, it will be seen that the plane of the girdle of the stone is coincident with the center of the dop-arc $o$. Accordingly, when the stone is revolved for the purpose of adjusting its grain to the polishing surface, the width of band $u$ over which the stone sweeps in engagement with the polishing surface is materially less than as illustrated in Figs. 31 to 34 inclusive.

But by referring to the diagrams shown in Figs. 39 to 42 inclusive, it will be seen that if the stone be placed farther down on the line $f$ $o$, that the width of the grinding band required is only equal to the width of the facet, no matter to what position the stone be rotated, for the purpose of adjusting its grain with respect to the grinding surface. This brings the center of the facet in the line $g\ o$, so that as the stone is rotated about the line $g\ o$ for this purpose, it engages with the narrowest possible polishing band of width $u$ on the grinding surface.

Again, by inspection and consideration of the diagrams, it will be understood that the adjustment in position of the stone must be a longitudinal adjustment on the axis $f$ in relation to the center of the dop-arc $g\ e$ and that merely a longitudinal adjustment on the axis $g\ o$ would not suffice. Also, a means of adjustment on the axis $f$ would be useless unless associated with a setting-needle, or its equivalent, for locating stones as shown in Figs. 35 to 38 inclusive; or, with a setting-scale in connection with a setting-needle for locating stones as shown in Figs. 39 to 42 inclusive. The width of bands, shown in Figs. 35 to 38 will suffice for small stones, but if placed as in Figs. 31 to 34, would only suffice for very small stones.

In regard to the calculated tables for positioning the setting scale by which the stone is longitudinally adjusted along the axis $f\ o$, and also the table for positioning the operation scale 56, by which the stone is adjusted along the axis $g\ o$. For a given number of facets, the internal diameter of the facets in the plane of the girdle has a fixed relation to the diameter of the girdle. In other words, the ratio of internal diameter to external diameter or polygons is dependent on the number of sides of the polygon. So for a given number of facets and given angle of facets, the distance $y$ is proportional to the diameter of the girdle. Therefore, tables may be calculated giving $y$, for positioning the operation scale when stones are placed, as in diagrams of Figs. 35 to 38. Since there is a maximum proportion of facet $b\ d$ to the internal diameter of the girdle $a\ b$, and therefore, a fixed proportion of $b\ d$ to $a\ b$, and as $b\ d$ is so positioned on the axis $f\ o$ that it is bisected by the axis $g\ o$, hence, for a given number and angle of facets, the distance $x$ in the diagram of the Figs. 39 to 42 inclusive is exactly proportional to the diameters of the girdles. Therefore, tables giving the distance $x$ for positioning the setting scale 38, when the stones are placed as shown in Figs. 39 to 42 inclusive, may be prepared. Since the value of $x$ and the angle of facet determines $y'$ and $y'+y=w$, therefore tables may be calculated giving the distance $w$ for positioning the operation scale 56 for grinding stones placed as shown in Figs. 39 to 42 inclusive.

The necessity for exceedingly exact adjustment of the center $o$ to the surface of the finishing band of the grinding surface is apparent. This surface cannot for any considerable time remain in an exceedingly precise relative position, owing to the constant wearing away of that surface, and as the automatic tripping mechanism will always withdraw the stone at the zero position on the grinding-scale 107, therefore, for the best results, it is advisable to finish all the facets to within a fraction of one-thousandth of an inch, and then completely finish them consecutively. This may be done by positioning the operation scale 56 at a small amount short of the true position and when all the facets have been finished to this extent and withdrawn by the tripping mechanism, then to correct the position and completely finish them consecutively.

For setting stones, as shown in the diagrams in Figs. 35 to 42, inclusive, the calculation of tables may be avoided, if desired, by constructing or drawing diagrams of the required operation on an enlarged scale and directly measuring the distances $y$, $x$ and $w$, therefrom. This method may be resorted to as a means of precaution when calculating tables, and also for checking up prior calculations. Furthermore, tables may be prepared by grinding the facets and carefully watching the grinding operation and noting the readings on the scales, which are required to complete the facets. In such case, however, the setting should be set in the first instance, obviously short of the correct scale, in order that the stone may be withdrawn before it has been ground off too far, and then the setting corrected little by little, until the operation as determined by an inspection of the stone has been completed. The final setting is that required for the remaining facets, and may be recorded for future use, for that operation, for a stone of that diameter of girdle.

In Fig. 27, the setting indicator 40 is shown in position adjusted for a small stone. In Fig. 28 a larger stone is shown, and the setting indicator 40 is shown dropped to a lower position by the turning of the flange sleeve 32, so that the center of the plane of the girdle is brought down below the center of the arc of the dop-arc or arcuate guide, as shown in Figs. 39 to 42 inclusive.

It is understood that although in the specification the terms stone and gem are frequently used, these are intended to cover all hard bodies which it is desired to grind in a similar or equivalent manner. Furthermore, it being understood that although a number of novel features have been pointed out or described, it is not necessary that all of them be used together, as advantages and novel results may be obtained by the use of certain of the novel features alone, as well as in conjunction with one or more of the others, and many changes in detail may be made, as for instance, the spring 109 may not only exert its force in the same direction as the gravity-pressure lever 78 and yet serve to take up all the back-lash in the gearing between the pinions 105 and the main sleeve 46, but may have sufficient strength to render either or both the springs 141 and 253 unnecessary. In such event, however, although the weight 79 will exact a more uniform pressure on the main sleeve 46, yet this disadvantage may be sufficiently compensated by the reduction of parts thereby affected, and so, although the various improvements have been described in detail, and with respect to one particular embodiment of the invention, as exemplified in the machine for grinding and polishing diamonds, yet it is understood that the invention is not limited to such details, except as clearly specified in the appended claims, since many changes and modifications will occur to those skilled in the art, without departing from the spirit and scope of the invention, in its broader aspects.

Having fully and clearly described my invention, what is desired to be secured by Letters Patent of the United States is:—

1. In an apparatus of the class described, the combination of a polishing lap, a suitable frame, an arcuate guide vertically movable with respect to the lap and adapted to be rotated in a plane parallel to the lap, a dop carrying head carried by and adjustable along said arcuate guide, a gem holding arbor carried by the carrying head, a setting indicator also carried by the carrying head, and a flanged sleeve for moving the gem holding arbor toward the lap relatively to the setting indicator to bring the gem into proper grinding position, and a flanged sleeve for adjusting the setting indicator relatively to the carrying head and gem holding arbor.

2. In an apparatus of the class described, the combination of a polishing lap, a suitable frame, an arcuate guide vertically movable with respect to the frame and lap and adapted to be rotated in a plane parallel to the lap, a dop carrying head carried by and adjustable along said arcuate guide, a gem holding arbor carried by said head, a stone setting indicator with a coöperating indicating scale also carried by said head and means for moving the gem holding arbor with its stone relatively to the setting indicator, the setting indicator pointing to the center of the arc of the arcuate guide when the indicator reads zero.

3. In an apparatus of the class described, the combination of a suitable frame, a carrying head, a gem holding arbor carried by the carrying head, a setting indicator also carried by the carrying head and means for moving and adjusting the gem holding arbor relatively to the setting indicator, said indicator comprising a pointer, and means for moving said pointer toward and away from the stone to be ground.

4. In an apparatus of the class described, the combination of a suitable frame, a carrying head, a gem holding arbor carried by the carrying head, a setting indicator also carried by the carrying head and means for moving and adjusting the gem holding arbor relatively to the setting indicator, said indicator comprising a pointer, and means for moving said pointer toward and away from the stone to be ground and means for securely holding the pointer away from the stone.

5. In an apparatus of the class described, the combination of a polishing lap, a suitable frame, an arcuate guide vertically movable with respect to the frame and lap and adapted to be rotated in a plane parallel to the lap, a dop carrying head carried by and adjustable along said arcuate guide, a gem holding arbor carried by the carrying head, a setting indicator also carried by the carrying head, and a flanged sleeve for moving the gem holding arbor relatively to the setting indicator to bring the gem into proper grinding position, and a flanged sleeve for adjusting the setting indicator relatively to the carrying head and gem holding arbor, said indicator comprising a pointer, and means for moving said pointer toward and away from the stone to be ground, whereby the girdle of the stone may be easily adjusted in line with said pointer.

6. In an apparatus of the class described, the combination of a suitable frame, a carrying head, a gem holding arbor carried by the carrying head, a setting indicator also carried by the carrying head and means for moving and adjusting the gem holding arbor relatively to the setting indicator, a screw-threaded flanged sleeve for adjusting the setting indicator relatively to the carrying head and gem holding arbor, and a scale coöperating with said flanged sleeve, said sleeve having ten threads to the inch, whereby the scale may be read directly in tenths, hundredths and thousandths of an inch.

7. In an apparatus of the class described, the combination of a polishing lap, a suitable frame, means carried by the frame for feeding the stone to be ground against the lap, means for arresting the grinding operation when the stone has been ground to a predetermined extent and a screw-threaded flanged sleeve and coöperating scale for adjusting the extent to which the stone may be ground before such withdrawal, said sleeve having ten threads to the inch, whereby the scale may be read directly in tenths, hundredths and thousandths of an inch.

8. In an apparatus of the class described, the combination of a polishing lap, a suitable frame, means carried by the frame for feeding the stone to be ground against the lap, means for arresting the grinding operation when the stone has been ground to a predetermined extent, means for adjusting the extent to which the stone may be ground before such arresting and a pointer and coöperating scale for continuously indicating the progress of the grinding operation, and means for adjusting said pointer so that it may always indicate the same point on the scale when such arresting takes place, irrespective of the amount to be ground.

9. In an apparatus of the class described, the combination of a polishing lap, a suitable frame, means carried by the frame for feeding the stone to be ground against the lap, means for arresting the grinding operation when the stone has been ground to a predetermined extent, means for adjusting the extent to which the stone may be ground before such arresting and a pointer and coöperating scale for continuously indicating the progress of the grinding operation, said arresting means being actuated to arrest the grinding operation when said pointer has reached a fixed point on said scale, irrespective of the amount to be ground.

10. In an apparatus of the class described, the combination of a polishing lap, a suitable frame, means carried by the frame for feeding the stone to be ground against the lap, means for arresting the grinding operation when the stone has been ground to a predetermined extent, means for adjusting the extent to which the stone may be ground before such arresting and a pointer and coöperating scale for continuously indicating the progress of the grinding operation, said arresting means being actuated to arrest the grinding operation when said pointer reads zero on said scale, irrespective of the amount to be ground.

11. In an apparatus of the class described, the combination of a polishing lap, a suitable frame, means carried by the frame for feeding the stone to be ground against the lap, means for arresting the grinding operation by withdrawing the stone from the lap, when the stone has been ground to a predetermined extent, means for adjusting the extent to which the stone may be ground before such arresting and a pointer and coöperating scale for continuously indicating the progress of the grinding operation, said arresting means being actuated to arrest the grinding operating when said pointer has reached a fixed point on said scale, irrespective of the adjustment of said adjusting means.

12. In an apparatus of the class described, the combination of a polishing lap, a suitable frame, means carried by the frame for feeding the stone to be ground against the lap, said means embracing a train of gears operated by the movement of the stone toward the lap and a body adapted to be reciprocated by said gears, whereby the inertia of said body causes a slow approach of the stone toward the lap before the stone engages the lap, and means whereby the stone is automatically withdrawn from the lap without causing reciprocation of said body.

13. In a machine of the class described, the combination of a polishing lap, means for holding the stone in engagement with the lap to be polished, means for causing the stone to be pressed against the lap with a pressure varying as the grinding or polishing proceeds, and means for compensating for the weight of the moving parts so that their weight does not materially affect said varying pressure means.

14. In an apparatus of the class described, the combination of a polishing lap, a suitable frame, means carried by the frame for feeding the stone to be ground against the lap, a train of gears operated by the movement of the stone toward the lap, and a pointer operated by said gears and a scale coöperating with said pointer whereby the progress of the grinding operation is indicated, and means for continually taking up back lash between said gears.

15. In an apparatus of the class described, the combination of a polishing lap, a frame, means carried by the frame for holding the stone to be ground in engagement with the lap and means for withdrawing the stone from the lap when it has been ground to a predetermined extent, said last mentioned means comprising two levers, one moved in accordance with the movement of the stone toward the lap and the other lever being fulcrumed on the first lever, a spring tending to rotate the second lever about its fulcrum, means holding said levers in fixed relation to one another against the action of said spring, a third lever and gears for controlling said holding means and a trip device for locking said third lever and adapted to be operated by engagement with a part in fixed relation with the frame, whereby, upon said first lever being given a predetermined movement, both the trip device and the holding means are operated and the spring acts to withdraw the stone from the lap.

16. In an apparatus of the class described, the combination of a polishing lap, a frame, means carried by the frame for holding the stone to be ground in engagement with the lap and means for withdrawing the stone from the lap when it has been ground to a predetermined extent, said last mentioned means comprising a member moved in accordance with the movement of the stone toward the lap, a member carried thereby, and adapted to engage a part fixed on the frame, a spring acting between said members to withdraw the stone from the lap when said second member engages said fixed part, means including a trip device carried by one of said members for holding said members in fixed relation to one another against the action of said spring, said trip device being carried at a point where its movement is magnified with respect to the movement of the stone, said trip device being adapted to engage a part in fixed relation with the frame when the stone has been ground to a predetermined extent, and thereby release said second member, whereby the spring acts to withdraw the stone from the lap.

17. In an apparatus of the class described, the combination of a polishing lap, a frame, means carried by the frame for holding the stone to be ground in engagement with the lap and means for withdrawing the stone from the lap when it has been ground to a predetermined extent, said last mentioned means comprising a member moved in accordance with the movement of the stone toward the lap, a member carried thereby and adapted to engage a part fixed on the frame, a spring acting between said members to withdraw the stone from the lap when said second member engages said fixed part, means including a trip device carried by one of said members for holding said members in fixed relation to one another against the action of said spring, said trip device being carried at a point where its movement is magnified with respect to the movement of the stone, and said trip device being adapted to engage a part in fixed relation with the frame when the stone has been ground to a predetermined extent, and thereby release said second member, whereby the spring acts to withdraw the stone from the lap, said trip device comprising a lever having its short arm adapted to engage the said fixed part and its long arm adapted to act to release said second member.

18. In an apparatus of the class described, the combination of a polishing lap, a frame, means carried by the frame for holding the stone to be ground in engagement with the lap and means for withdrawing the stone from the lap when it has been ground to a predetermined extent, said last mentioned means comprising a member moved in accordance with the movement of the stone toward the lap, a member carried thereby and adapted to engage a part fixed on the frame, a spring acting between said members to withdraw the stone from the lap when said second member engages said fixed part, a trip device carried by one of said members for holding said members in fixed relation to one another against the action of said spring, said trip device being adapted to engage a part in fixed relation with the frame when the stone has been ground to a predetermined extent, and thereby release said second member, whereby the spring acts to withdraw the stone from the lap.

19. In an apparatus of the class described, the combination of a polishing lap, a frame, means carried by the frame for holding the stone to be ground in engagement with the lap and means for withdrawing the stone from the lap when it has been ground to a predetermined extent, said last mentioned means comprising a member moved in accordance with the movement of the stone toward the lap, a member carried thereby, a spring acting between said members to withdraw the stone from the lap, a trip device carried by one of said members for holding said members in fixed relation to one another against the action of said spring, said trip device being carried at a point where its movement is magnified with respect to the movement of the stone, and said trip device being adapted to engage a part in fixed relation with the frame when the stone has been ground to a predetermined extent, and thereby release said second member whereby the spring acts to withdraw the stone from the lap.

20. In an apparatus of the class described, the combination of a polishing lap, a frame, means carried by the frame for holding the stone to be ground in engagement with the lap and means for withdrawing the stone from the lap when it has been ground to a predetermined extent, said last mentioned means comprising a member moved in accordance with the movement of the stone toward the lap, a member carried thereby, a spring acting between said members to withdraw the stone from the lap, a trip device carried by one of said members for holding said members in fixed relation to one another against the action of said spring, said trip device being adapted to engage a part in fixed relation with the frame when the stone has been ground to a predetermined extent, and thereby release said second member, whereby the spring acts to withdraw the stone from the lap.

21. In an apparatus of the class described, the combination of a polishing lap, a frame, means carried by the frame for holding the stone to be ground in engagement with the lap and means for withdrawing the stone from the lap when it has been ground to a predetermined extent, said last mentioned means comprising a lever member moved in accordance with the movement of the stone toward the lap, a second lever member pivoted to the first lever member, and adapted to engage a fixed part on the frame, a spring acting between said members to withdraw the stone from the lap, a trip device carried by one of said members for holding said members in fixed relation to one another against the action of said spring, said trip device being adapted to engage a part in fixed relation with the frame when the stone has been ground to a predetermined extent, and thereby release said second member, whereby the spring acts to withdraw the stone from the lap.

22. In an apparatus of the class described, the combination of stone polishing means, means for carrying the stone to be ground in engagement with the polishing means, a trip mechanism set for withdrawing the stone carrying means from the polishing means when the stone has been ground to a predetermined extent, and means whereby the trip mechanism may be reset by a further withdrawing of the stone carrying means from the polishing means.

23. In an apparatus of the class described, the combination of a stone polishing means, means for carrying the stone to be ground in engagement with the polishing means, a trip mechanism set for withdrawing the stone carrying means from the polishing means when the stone has been ground to a predetermined extent and means for positively stopping the movement of the stone toward the polishing means at the point where the trip mechanism is set to withdraw the stone carrying means, in case the trip mechanism fails to so withdraw the stone carrying means.

24. In an apparatus of the class described, the combination of stone polishing means, means for carrying the stone to be ground in engagement with the polishing means, a trip mechanism set for withdrawing the stone carrying means from the polishing means when the stone has been ground to a predetermined extent, and means whereby the trip mechanism may be reset by a further withdrawing of the stone carrying means from the polishing means, and means for positively stopping the movement of the stone toward the polishing means at the point where the trip mechanism is set to withdraw the stone carrying means, in case the trip mechanism fails to so withdraw the stone carrying means.

25. In an apparatus of the class described, the combination of stone polishing means, means for carrying the stone to be ground in engagement with the polishing means, a trip mechanism set for withdrawing the stone carrying means from the polishing means when the stone has been ground to a predetermined extent, and means whereby the trip mechanism may be reset by a further withdrawing of the stone carrying means from the polishing means, said last mentioned means embracing a part fixed on the frame adapted to effect the resetting and also limit the movement of the trip mechanism in the direction in which it is moved to cause the resetting.

26. In an apparatus of the class described, the combination of stone polishing means, means for carrying the stone to be ground in engagement with the polishing means, a trip mechanism set for withdrawing the stone carrying means from the polishing means when the stone has been ground to a predetermined extent, said trip mechanism having a trip device moved by the movement of the stone toward the polishing means, and given a continuous magnified movement with respect to the movement of the stone toward the polishing means, and means whereby said trip device is operated upon the occurrence of a certain movement thereof.

27. In an apparatus of the class described, the combination of stone polishing means, means for carrying the stone to be ground in engagement with the polishing means, a trip mechanism set for withdrawing the stone carrying means from the polishing means when the stone has been ground to a predetermined extent, said trip mechanism comprising a member which is given a movement as the stone moves toward the polishing means, a spring and connecting mechanism for acting upon said member to move it in the opposite direction to withdraw the stone from the polishing means, a catch mechanism coöperating therewith to lock said spring so that it will not act to withdraw the stone, said catch mechanism comprising a locking lever and means acting on said lever tending to unlock the catch mechanism to allow the spring to raise the stone and means whereby a predetermined movement of the first mentioned member actuates said catch mechanism.

28. In an apparatus of the class described, the combination of stone polishing means, means for carrying the stone to be ground in engagement with the polishing means, a trip mechanism set for withdrawing the stone carrying means from the polishing means when the stone has been ground to a predetermined extent, said trip mechanism comprising a member which is given a movement as the stone moves toward the polishing means, a spring and connecting mechanism for acting upon said member to move it in the opposite direction to withdraw the stone from the polishing means, a catch mechanism coöperating therewith to lock said spring so that it will not act to withdraw the stone, said catch mechanism comprising a locking lever, means acting on said lever tending to unlock the catch mechanism to allow the spring to raise the stone, means whereby a predetermined movement of the first mentioned member actuates said catch mechanism, said locking lever being weighted and a part fixed on the frame coöperating therewith, whereby the lever acts to unlock said locking mechanism and coöperates with said fixed part to reset the trip mechanism.

29. In an apparatus of the class described, the combination of a polishing lap, a frame, means carried by the frame for holding the stone to be ground in engagement with the lap and means for withdrawing the stone from the lap when it has been ground to a predetermined extent, said last mentioned means comprising a member moved in accordance with the movement of the stone toward the lap, a member carried thereby and adapted to engage a part fixed on the frame, a spring acting between said members to withdraw the stone from the lap when said second member engages said fixed part, a trip device carried by one of said members for holding said members in fixed relation to one another against the action of said spring, said trip device being carried at a point where its movement is magnified with respect to the movement of the stone, and adapted to engage a part in fixed relation with the frame, and thereby release said second member whereby the spring acts to withdraw the stone from the lap, said trip device comprising a lever having its short arm adapted to engage said fixed part and its long arm adapted to act to release said second member, a stop for said lever to limit the engagement of its long arm with the tripping mechanism, and said lever being so weighted that gravity holds it against said stop.

30. In an apparatus of the class described, the combination of stone polishing means, a spindle for carrying the stone to be ground in engagement with the polishing means, a trip mechanism set for withdrawing the stone carrying means from the polishing means when the stone has been ground to a predetermined extent, said trip mechanism having a member moved by the spindle, but a portion of which has a magnified movement with respect to the movement of the spindle, as the spindle moves toward the polishing means, and means whereby the trip mechanism is operated to withdraw the stone at a certain point in said magnified movement.

31. In a gem polishing machine, the combination of polishing means, means for holding the stone to be polished in engagement with the polishing surface of the polishing means, means for reciprocating the stone over the polishing surface and means for varying the amplitude of said reciprocations.

32. In an apparatus of the class described, the combination of polishing means, means for holding the stone to be polished in engagement with the polishing surface of the polishing means, means for reciprocating the stone over the polishing surface and means whereby the amplitude and rate of said reciprocations may be simultaneously varied.

33. In an apparatus of the class described, the combination of a rotary polishing lap, means for holding the stone to be polished in engagement with the lap, means for reciprocating the stone over the lap and means for varying the amplitude of said reciprocations and adjusting the pressure with which the stone is held against the lap during the polishing operation.

34. In an apparatus of the class described, the combination of a rotary polishing lap, means for holding the stone to be polished in engagement with the lap, means for reciprocating the stone over the lap and means whereby the amplitude of said reciprocations may be simultaneously varied and while the stone is being polished.

35. In an apparatus of the class described, the combination of polishing means, means for holding the stone to be polished in engagement with the polishing surface of the polishing means, means for reciprocating the stone over the polishing surface and means for varying the amplitude of said reciprocations and means for varying the number of said reciprocations per unit of time, said last mentioned means including a movable controlling handle and means for securely holding said handle in any one of its various speed positions and causing said handle to automatically pass to the next speed position when it has passed a certain distance from the speed position on either side thereof.

36. In an apparatus of the class described, the combination of a polishing lap, means for holding the stone to be polished in engagement with the lap to effect the polishing thereof, means for laterally moving said holding means over the lap to effect the polishing at a different position on the lap, and means for relieving the pressure of the stone on the lap during the said lateral movement.

37. In an apparatus of the class described, the combination of a polishing lap, means for holding the stone to be polished in engagement with the lap to effect the polishing thereof, means for laterally moving said holding means over the lap to effect the polishing at a different position on the lap, and means whereby the operation of said last mentioned means effects a slight withdrawing of the stone from the lap before the lateral movement takes place, whereby the pressure of the stone on the lap is relieved during the lateral movement.

38. In an apparatus of the class described, the combination of a polishing lap, means for holding the stone to be polished in engagement with the lap to effect the polishing thereof, means for laterally moving said holding means over the lap to effect the polishing at a different position on the lap, and means for slightly withdrawing the stone from the lap during said lateral movement, said last mentioned means embracing mechanism for laterally moving the holding means, mechanism for slightly raising the holding means and a handle, the movement of which in one direction operates the first mechanism to effect a lateral movement in one direction and movement of which in the other direction operates the first mechanism to effect a lateral movement in the opposite direction, and movement of which in either direction first operates the second mechanism.

39. In an apparatus of the class described, the combination of a polishing lap, means for holding the stone to be polished in engagement with the lap to effect the polishing thereof, means for laterally moving said holding means over the lap in either direction to effect the polishing at a different position on the lap and means whereby the operation of said last mentioned means effects a slight withdrawing of the stone from the lap before the lateral movement takes place, whereby the stone is slightly withdrawn from the lap during the lateral movement, irrespective of the direction of said lateral movement.

40. In an apparatus of the class described, the combination of a polishing lap, means for holding the stone to be polished in engagement with the lap to effect the polishing thereof, means for laterally moving said holding means over the lap to effect the polishing at a different position on the lap, and means whereby the operation of said last mentioned means effects a slight withdrawing of the stone from the lap before the lateral movement takes place, and a replacing of the stone against the lap for polishing upon the completion of the lateral movement, whereby the stone is slightly withdrawn from the lap during the lateral movement.

41. In an apparatus of the class described, the combination of a polishing lap, means for holding the stone to be polished in engagement with the lap to effect the polishing thereof, means for laterally moving said holding means over the lap to effect the polishing at a different position on the lap, and means for slightly withdrawing the stone from the lap during said lateral movement, said last mentioned means embracing mechanism for laterally moving the holding means, mechanism for slightly raising the holding means, and a handle, the movement of which in one direction operates the first mechanism to effect a lateral movement in one direction, and movement of which in the other direction operates the first mechanism to effect a lateral movement in the opposite direction, and movement of which in either direction first operates the second mechanism to withdraw the stone before the lateral movement and replace the stone against the lap for polishing upon the completion of the lateral movement.

42. In an apparatus of the class described, the combination of a moving polishing lap, a frame extending over the lap and carrying the stone to be ground against the polishing surface of the lap, said frame being pivoted to rock about an axis substantially parallel to the polishing face of the lap, the stone being held against the lap at one side of the plane drawn through said axis and at right angles to the polishing surface, whereby the stone may be withdrawn from the lap for inspection without affecting the adjustment of the stone with respect to said frame, and means for securely holding the frame in its position with the stone against the lap.

43. In an apparatus of the class described, the combination of a moving polishing lap, a frame extending over the lap and carrying the stone to be ground against the polishing surface of the lap, said frame being pivoted to rock about an axis substantially parallel to the polishing face of the lap, whereby the stone may be withdrawn from the lap for inspection, and means for securely holding the frame in its position with the stone against the lap.

44. In an apparatus of the class described, the combination of a moving polishing lap, a frame extending over the lap and carrying the stone to be ground against the polishing surface of the lap, said frame being pivoted to rock about an axis substantially parallel to the polishing face of the lap, whereby the stone may be withdrawn from the lap for inspection, and means for locking the frame in its position with the stone against the lap, a handle for rotating said frame about its axis to withdraw the stone and means whereby the initial movement of said handle releases said locking means.

45. In an apparatus of the class described, the combination of a moving polishing lap, a frame extending over the lap and carrying the stone to be ground against the polishing surface of the lap, said frame being pivoted to rock about an axis substantially parallel to the polishing face of the lap, whereby the stone may be withdrawn from the lap for inspection, and means for locking the frame in its position with the stone against the lap, a handle for rotating said frame about its axis to withdraw the stone and means whereby the initial movement of said handle releases said locking means.

46. In an apparatus of the class described, the combination of a polishing lap, a frame, stone holding means carried by the frame, means for feeding the stone-holding means toward the lap to hold the stone in engagement with the polishing surface of the lap, said means embracing means for causing the stone to be pressed against the lap with increasing pressure as the grinding proceeds, and means for compensating for the weight of said stone-holding means by overbalancing the same.

47. In an apparatus of the class described, the combination of a polishing lap, a frame, stone-holding means carried by the frame, means for feeding the stone-holding means toward the lap to hold the stone in engagement with the polishing surface of the lap, and causing the stone to be pressed against the lap with increasing pressure as the grinding proceeds, and means for opposing said feeding means by substantially compensating for the weight of said stone holding means, said last mentioned means embracing a spring pressed lever tending to move the said stone-holding means away from the lap.

48. In an apparatus of the class described, a rotary polishing lap, a supporting table adjacent thereto, a frame secured to said table and extending over the lap, means carried by said frame for holding the stone to be ground on the polishing surface of the lap, an electric motor secured beneath said table, connections whereby said motor is adapted to reciprocate the stone transversely of the lap, and a handle secured to the frame above the table for varying the speed of the motor to vary the rate of said reciprocations.

49. In an apparatus of the class described, a rotary polishing lap, a supporting table adjacent thereto, a frame secured to said table and extending over the lap, means carried by said frame for holding the stone to be ground on the polishing surface of the lap, an electric motor secured beneath said table, connections whereby said motor is adapted to reciprocate the stone transversely of the lap, a rheostat secured beneath the table for varying the speed of the motor, a handle secured to the frame above the table, and connections from said handle above the table whereby movement of said handle will vary the rate of said reciprocations.

50. In an apparatus of the class described, the combination of a polishing lap, a suitable frame, a spindle slidably mounted in said frame, means carried by said spindle for holding the stone in contact with the lap to grind or polish the stone, and a stuffing box on each side of the frame where the spindle enters the same, to clean the dust and dirt from the spindle where it enters and bears in the frame, to prevent the dust and dirt from affecting the movement of the spindle through the frame.

51. In an apparatus of the class described, the combination of a polishing lap, means for holding the stone to be polished in engagement with the lap, means for continuously reciprocating the stone over the lap during the polishing operation and means for simultaneously varying the amplitude of said reciprocations by gradations infinitesimally small until no reciprocation will take place.

52. In an apparatus of the class described, the combination of a moving polishing lap, and a frame extending over the lap and carrying the stone to be ground against the polishing surface of the lap, said frame being pivoted to rock about an axis substantially parallel to the polishing surface of the lap, whereby upon rotation of said frame the stone may be withdrawn from the lap for inspection, means for locking the frame in its position with the stone against the lap and also for sustaining the frame in its rotated position with the stone withdrawn from the lap, and a handle for rotating said frame and controlling said locking means.

53. In an apparatus of the class described, the combination of a polishing lap, a frame, a spindle divided into a series of parts and movable in the frame toward and away from the lap, means carried by one part of the spindle for carrying the stone to be ground or polished in engagement with the lap, a tripping mechanism engaging another part of the spindle, to be operated thereby, whereby, when said last mentioned part has moved a predetermined distance toward the lap, said tripping mechanism is operated to withdraw the stone from the lap, and means for adjusting said first mentioned part of the spindle relatively to said other part, whereby the tripping and withdrawing of the stone may be effected when the stone is at different positions with respect to the lap, and means for taking up back lash between said spindle parts.

54. In an apparatus of the class described, the combination of a polishing lap, a frame, a three part spindle, movable in the frame toward and from the lap, each of said parts being adjustable one with respect to another in series relation, means carried by one part of the spindle for carrying the stone to be ground in engagement with the polishing surface of the lap, means for adjusting said carrying part with respect to the second part of the spindle, means for adjusting the third part with respect to the second part of the spindle, a tripping mechanism engaging the third part of the spindle to be operated by the movement thereof, whereby, when said third part has moved a predetermined distance toward the lap, said tripping mechanism is operated to withdraw the stone from the lap, and means for taking up back lash between said spindle parts.

55. In an apparatus of the class described, the combination of a polishing lap, a frame, a three part spindle movable in the frame toward and from the lap, each of said parts being adjustable one with respect to another in series relation, means carried by one part of the spindle for carrying the stone to be ground in engagement with the polishing surface of the lap, said means including an arcuate guide, and a carrying head adjustable along said guide to present different facets of the stone to the lap, means for adjusting said carrying part with respect to the second part of the spindle, means for adjusting the third part with respect to the second part of the spindle, a tripping mechanism engaging the third part of the spindle to be operated by the movement thereof, whereby, when said third part has moved a predetermined distance toward the lap, said tripping mechanism is operated to withdraw the stone from the lap, one of said adjusting means comprising an operation scale, adapted to always read at zero when the center of the arc of the arcuate guide is in the plane of the polishing lap.

56. In an apparatus of the class described, the combination of a suitable frame, a polishing lap, a carrying head, a gem holding arbor carried by the carrying head, a setting indicator also carried by the carrying head and adjustable longitudinally of the arbor, and means for moving and adjusting the gem holding arbor toward the lap relatively to the setting indicator.

57. In an apparatus of the class described, the combination of a polishing lap, a spindle having its axis perpendicular to the lap and rotatable in a plane parallel thereto, an arcuate guide carried by said spindle, a carrying head carried by and adjustable along said guide, a stone containing arbor carried by said carrying head, a longitudinally adjustable setting indicator, and means for adjusting the position of the stone and arbor so as to bring the axial line of the spindle substantially in the center of the face of the stone being ground, irrespective of the position of the carrying head in the arcuate guide.

58. In an apparatus of the class described, the combination of a suitable polishing lap, a gem holding arbor carried by the carrying head, a setting indicator also carried by the carrying head and means for moving and adjusting the gem holding arbor relatively to the setting indicator toward the lap, and means for adjusting the setting indicator relatively to the carrying head and gem holding arbor and toward the lap.

59. In an apparatus of the class described, the combination of a polishing lap, a suitable frame, an arcuate guide vertically movable with respect to the frame and lap and adapted to be rotated in a plane parallel to the lap, a dop carrying head carried by and adjustable along said arcuate guide, a gem holding arbor carried by the carrying head, a setting indicator also carried by the carrying head and means for moving and adjusting the gem holding arbor toward the lap relatively to the setting indicator and means for adjusting the setting indicator toward the lap relatively to the carrying head and gem holding arbor, means for withdrawing the dop carrying head from the lap when the gem has been ground to a predetermined extent, and means for adjusting the extent to which the stone may be ground before such withdrawal, each of said adjusting means being operatable independently of the others.

In testimony whereof, I have signed my name to this specification, in the presence of two subscribing witnesses.

JOSEPH G. C. MANTLE.

Witnesses:
 GORHAM CROSBY,
 EDWIN SEGER.